United States Patent

Kammeraad et al.

[11] Patent Number: 6,099,213
[45] Date of Patent: Aug. 8, 2000

[54] AUTOMATIC BORING DEVICE

[75] Inventors: James Kammeraad, Holland; Randall D. Hilbrand, Zeeland; R. Clayton McKeon, Holland, all of Mich.

[73] Assignee: K-Line Industries, Inc., Holland, Mich.

[21] Appl. No.: 09/185,699

[22] Filed: Nov. 4, 1998

Related U.S. Application Data

[63] Continuation of application No. PCT/US98/04477, Mar. 6, 1998.
[60] Provisional application No. 60/040,347, Mar. 7, 1997.
[51] Int. Cl.[7] .............................. B23B 45/04; B23B 45/14
[52] U.S. Cl. ................................. 408/14; 408/80; 408/75; 408/83.5; 408/111; 408/115 R; 408/130; 408/234; 408/702; 408/712; 451/430
[58] Field of Search ................................. 408/14, 79–82, 408/75, 83.5, 110–112, 115 R, 115 B, 130, 234, 236, 237, 702, 712; 451/430

[56] References Cited

U.S. PATENT DOCUMENTS

| | | | |
|---|---|---|---|
| 2,065,486 | 12/1936 | Albertson ................................. | 408/82 |
| 2,360,942 | 10/1944 | Ellerstein . | |
| 2,657,595 | 11/1953 | Shaff . | |
| 2,674,098 | 4/1954 | Taylor . | |
| 2,722,854 | 11/1955 | Parrington . | |
| 2,896,677 | 7/1959 | Payzant . | |
| 3,152,650 | 10/1964 | Savidge . | |
| 3,248,974 | 5/1966 | Alexander et al. ...................... | 408/130 |
| 3,266,580 | 8/1966 | Clapp et al. ............................ | 408/130 |
| 3,409,090 | 11/1968 | Brown .................................... | 408/130 |
| 4,545,706 | 10/1985 | Hiroyasu et al. . | |
| 5,094,570 | 3/1992 | LaCombe, Jr. et al. . | |
| 5,148,633 | 9/1992 | Pigott et al. . | |
| 5,205,682 | 4/1993 | Jinkins . | |
| 5,281,057 | 1/1994 | Ritt . | |
| 5,445,478 | 8/1995 | Ordogh et al. ......................... | 408/83.5 |
| 5,584,618 | 12/1996 | Blankenship et al. . | |

FOREIGN PATENT DOCUMENTS 53832  5/1989  Hungary .

OTHER PUBLICATIONS

Parts Manufacturing Company Ltd. brochure on "The 'Rapid' Hand–Held Ream Jig," part No. 980, 5 pages.
Parts Manufacturing Company Ltd. brochure on "Rapid Crankshaft Repair Sleeves and Phosphor–Bronze Valve Guide Sleeves," 4 pages.

*Primary Examiner*—Steven C. Bishop
*Attorney, Agent, or Firm*—Price, Heneveld, Cooper, DeWitt & Litton

[57] ABSTRACT

An automatic boring device is provided that comprises a tool housing having attached to it two opposing handles with switches mounted thereon for selective engagement of pneumatic controls that activate a clamping device, rotation of a chuck of a pneumatic drill, and downward movement of the drill. The pneumatic drill is removable and the depth of the downward boring stroke is adjustable.

33 Claims, 12 Drawing Sheets

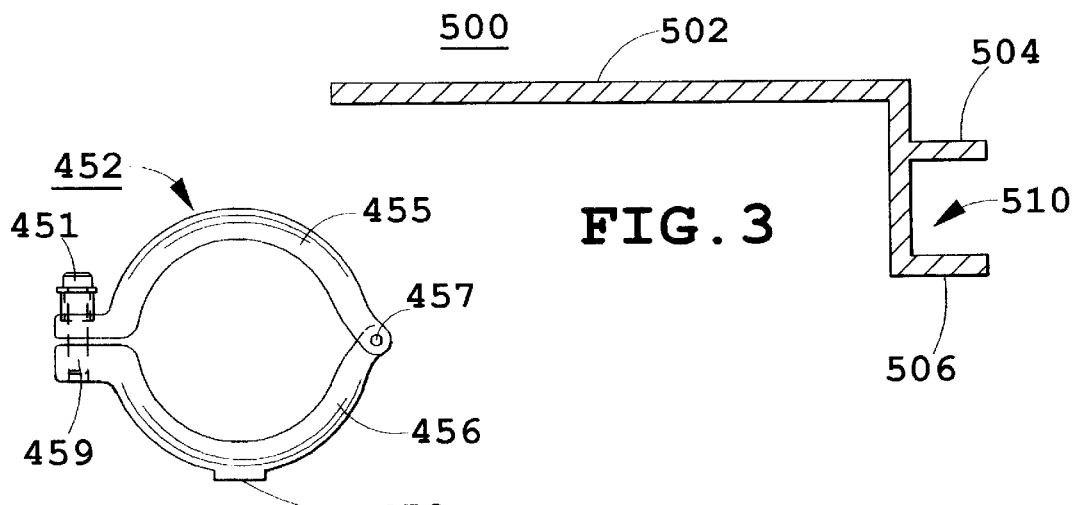
FIG. 11
FIG. 3
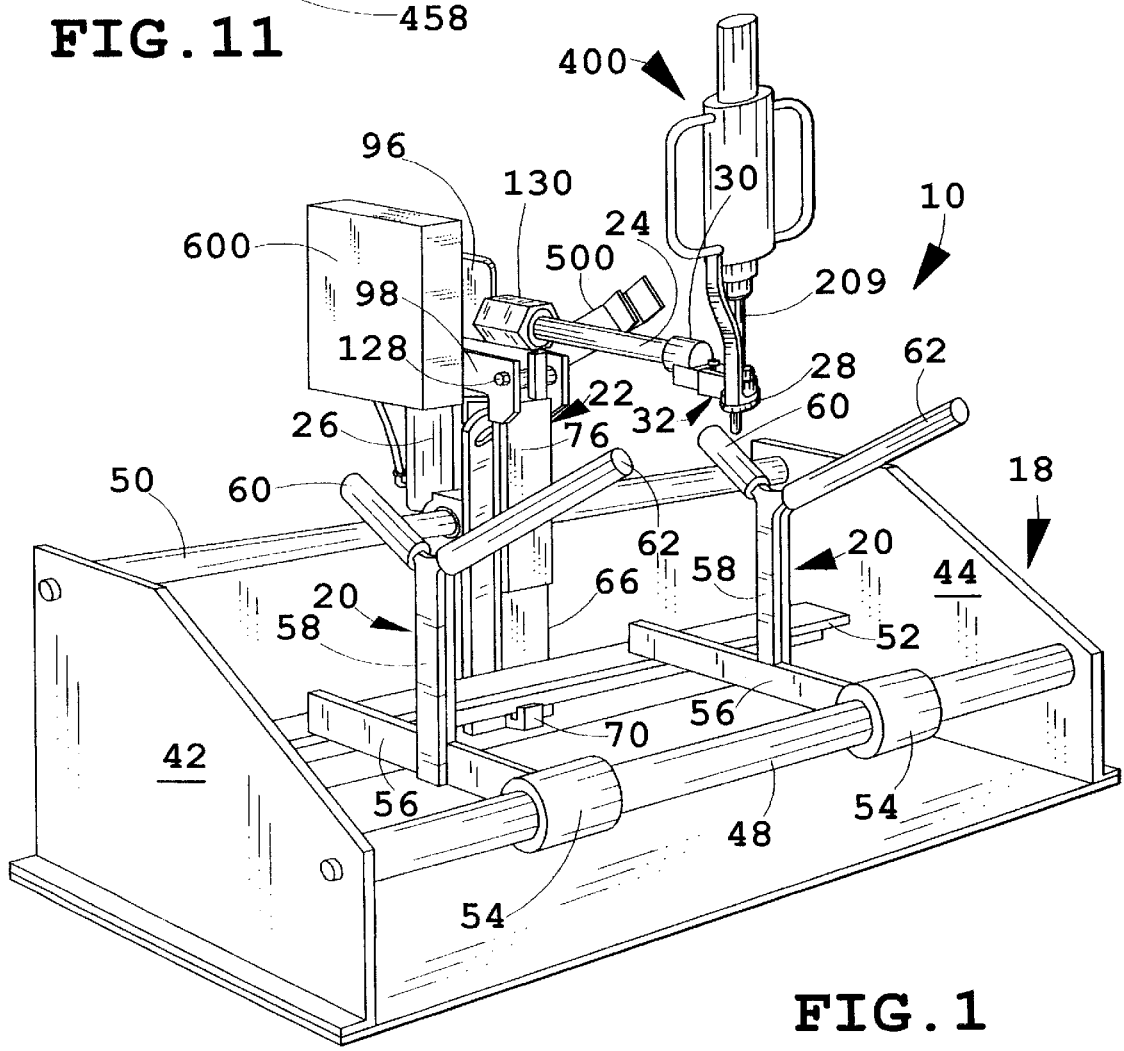
FIG. 1

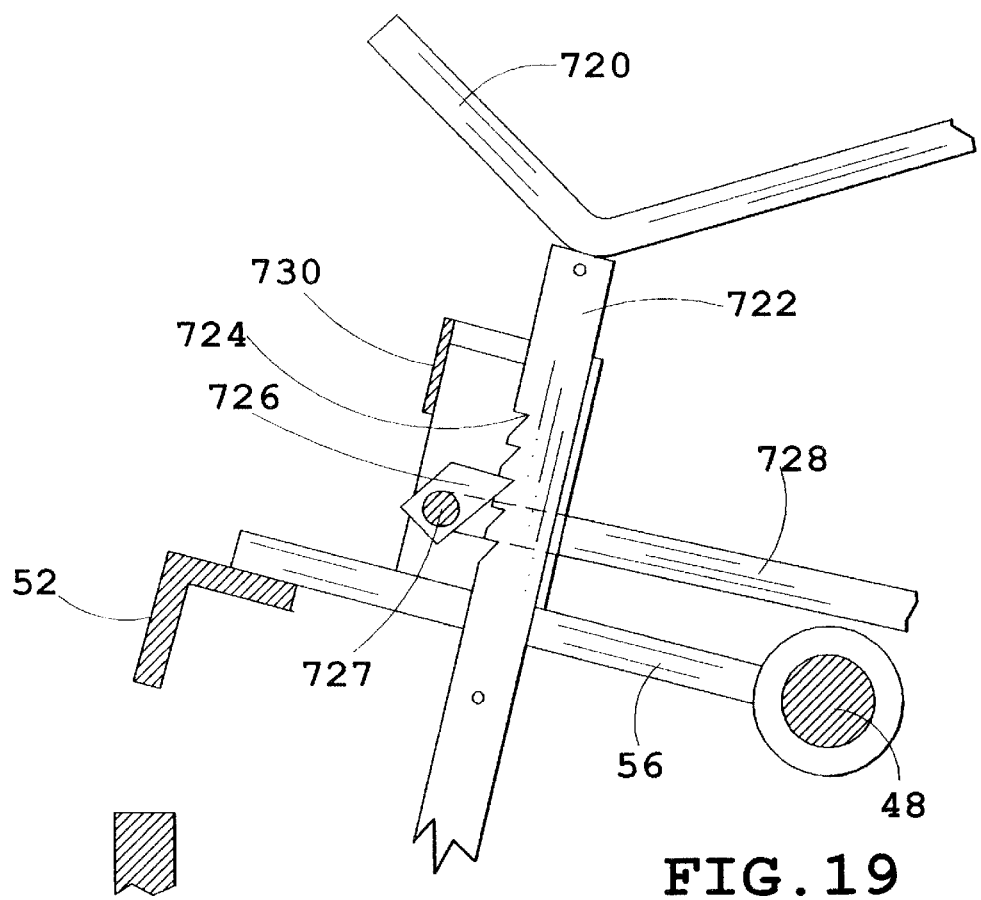
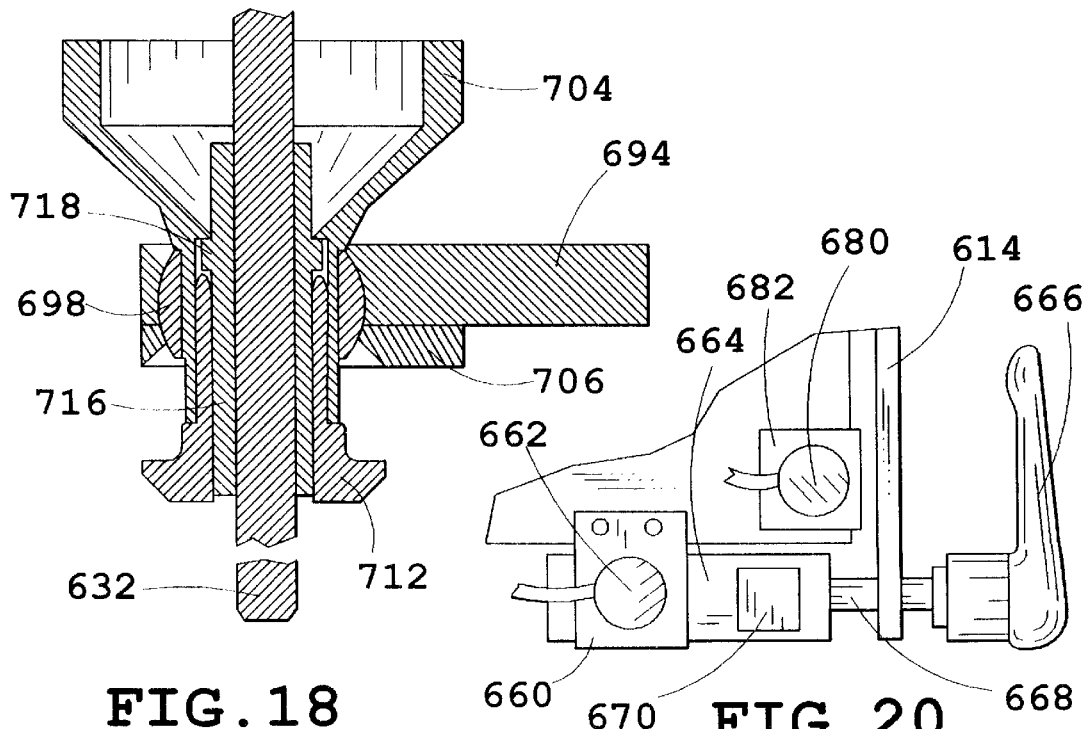
FIG. 19
FIG. 18
FIG. 20

AUTOMATIC BORING DEVICE

CROSS-REFERENCE TO RELATED APPLICATIONS

This application is a continuation under 35 U.S.C. §120 on PCT Application No. PCT/U.S. Pat. No. 98/04477, filed Mar. 6, 1998, which claims priority under 35 U.S.C. §119(e) on U.S. Provisional application No. 60/040,347, filed on Mar. 7, 1997, the disclosures of which are incorporated by reference herein.

BACKGROUND OF THE INVENTION

This invention relates to tools for the reworking of valve guides in cylinder heads for internal combustion engines, and more particularly, to both a fixture for guiding the reworking operations on valve guides and a boring tool used with such fixtures.

In the past, valve guide reworking operations have been accomplished by using either large and immovable machines requiring the precise mounting of cylinder heads on the machine at an angle in order to produce the proper reworking alignment, or smaller tools which could be mounted on the cylinder head. The large machines typically include a heavy base on which is mounted a drill press or other boring tool, thus necessitating the mounting of the cylinder head in a precise position to provide the proper alignment with the drill press. The cylinder head mounting on these machines is a tedious operation and one which, of necessity, must be repeated for each valve guide since the intake and exhaust valve guides in modern engines are often formed at opposing angles.

The smaller tools, which could be mounted on the cylinder head when the cylinder head was in any position, are based on alignment principles, which often produce inaccurate results. One smaller tool utilized the principle of aligning the guide tool with the valve guide bore by means of the valve spring seat on the side of the cylinder head opposite the valve seat. However, valve spring seats are normally not concentrically located with respect to the valve guide bore, thus causing this method to be inaccurate. Other small tools for the reworking operations necessitate a mounting guide fixture on the cylinder head by means of one of the many holes provided in the cylinder head to mount the head on the engine block. However, if the mounting hole was in any way deformed or displaced, the capability of aligning the tool properly was thereby reduced.

To overcome the above problems, a valve guide boring fixture was designed that allows a worker to quickly and easily align a boring guide with the central axis of the valve to ensure proper alignment. This valve guide boring fixture is described in commonly-assigned U.S. Pat. No. 5,281,057. This valve guide boring fixture is designed for use with a small, easily movable boring tool so as not to require movement of the cylinder head.

One problem associated with such smaller tools, however, is that they typically take the form of a hand drill having a general "L" shape whereby the palm of the user's hand is required to be facing downward when the drill is used to ream a vertically oriented bore. Such hand drills are thereby of relatively poor ergonomic design, since a worker utilizing such a tool may develop carpal tunnel syndrome through excessive, repetitive motions in using such hand tools.

Further problems relating to safety issues arise in the use of such tools, since there are many potential pinch points where a worker may be required to place his or her fingers during operation of the tool. Further still, the reliance of such prior art arrangements upon the operator's ability to feed the reaming shaft to the proper depth and at the proper speed, introduces inconsistent results. Also, the fatigue caused through the use of these tools can effect the accuracy of the reaming.

SUMMARY OF THE INVENTION

Accordingly, it is an object of the present invention to provide a boring device that ensures proper alignment with the central axis of each valve while requiring little effort on the part of the worker and without requiring movement of the cylinder head. It is still another object of the present invention to provide an ergonomically, well designed boring device, whereby the worker's hands are positioned on opposing handles on the tool in a natural position, with the controls for both the tool and the fixture device being located in an easily accessible position that does not require movement of the worker's hands relative to the tool for all phases of the boring operation.

Another object of the present invention is to provide a boring device and fixture device that do not require workers to place their fingers in any potential pinch points while operating the tool. Yet another object of the present invention is to provide a boring device in which the number of potential pinch points on the device itself are minimized. A further object of the present invention is to provide a boring device having an automatic feed for boring holes at a fixed path.

An additional aspect of the present invention is to provide a boring device that automates the feed of the reaming shaft into the valve. Yet another aspect is to provide an automatic boring device that has a fully adjustable boring rate, boring depth, and pilot length, and/or boring travel distance. A further aspect is to provide an automatic boring device that allows drills of different sizes to be readily interchanged. Another aspect is to provide a boring device that may be secured to a boring fixture assembly. Still yet another aspect of the invention is to provide a boring device that allows different sized valve seat adapters to be quickly and easily interchanged without requiring the boring device to be disattached from the boring fixture assembly.

To achieve these and other objects and advantages, the boring device of the present invention comprises a tool housing, a pneumatic drill positioned substantially in the tool housing and including a removable reaming shaft, at least one handle attached to the exterior of the tool housing, a first pneumatic control for clamping an alignment member onto a part that is desired to be bored, and a second pneumatic control for initiating movement of the drill and rotation of the reaming shaft.

Preferably, the housing is of sufficient size and dimensions to enclose the pneumatic drill. The tool housing may include an upper plate and a lower plate, a cylindrically shaped pneumatic drill positioned substantially in a vertical orientation and attached to the upper plate and the lower plate, the cylindrical drill having a reaming shaft extending beyond the lower plate, two opposing handles mounted on the tool housing, and a pneumatic control for affecting rotation of the reaming shaft and vertical movement of the drill.

The tool housing preferably has upright walls, an upper plate, and a lower plate, the pneumatic drill removably attached to the upper plate, a pneumatic control for stopping a supply of air to the drill and causing air to be supplied to an air cylinder to retract the drill upward at the end of a downward boring cycle, a stop plate attached to the tool housing being vertically adjustable along a vertical post attached to the lower plate, and a switch attached to the upper plate, the switch positioned to contact the adjustable plate at the end of a boring cycle to activate the pneumatic control.

These and other features, advantages and objects of the present invention will be further understood and appreciated by those skilled in the art by reference to the following specification, claims and appended drawings.

BRIEF DESCRIPTION OF THE DRAWINGS

In the drawings:

FIG. 1 is a perspective view of a boring system constructed in accordance with a first embodiment of the present invention;

FIG. 3 is a cross-sectional view of a cradle attachment used in the boring system of the present invention;

FIG. 11 is an enlarged perspective view of a holding collar of the boring device of the present invention;

FIG. 18 is a cross-sectional view of the assembled clamping mechanism of FIG. 17;

FIG. 19 is a side elevational view of the adjusting means of a fixture of the present invention;

FIG. 20 is a plan view of a portion of the boring device of FIG. 14; and

DETAILED DESCRIPTION OF THE PREFERRED EMBODIMENT

Figure 2:
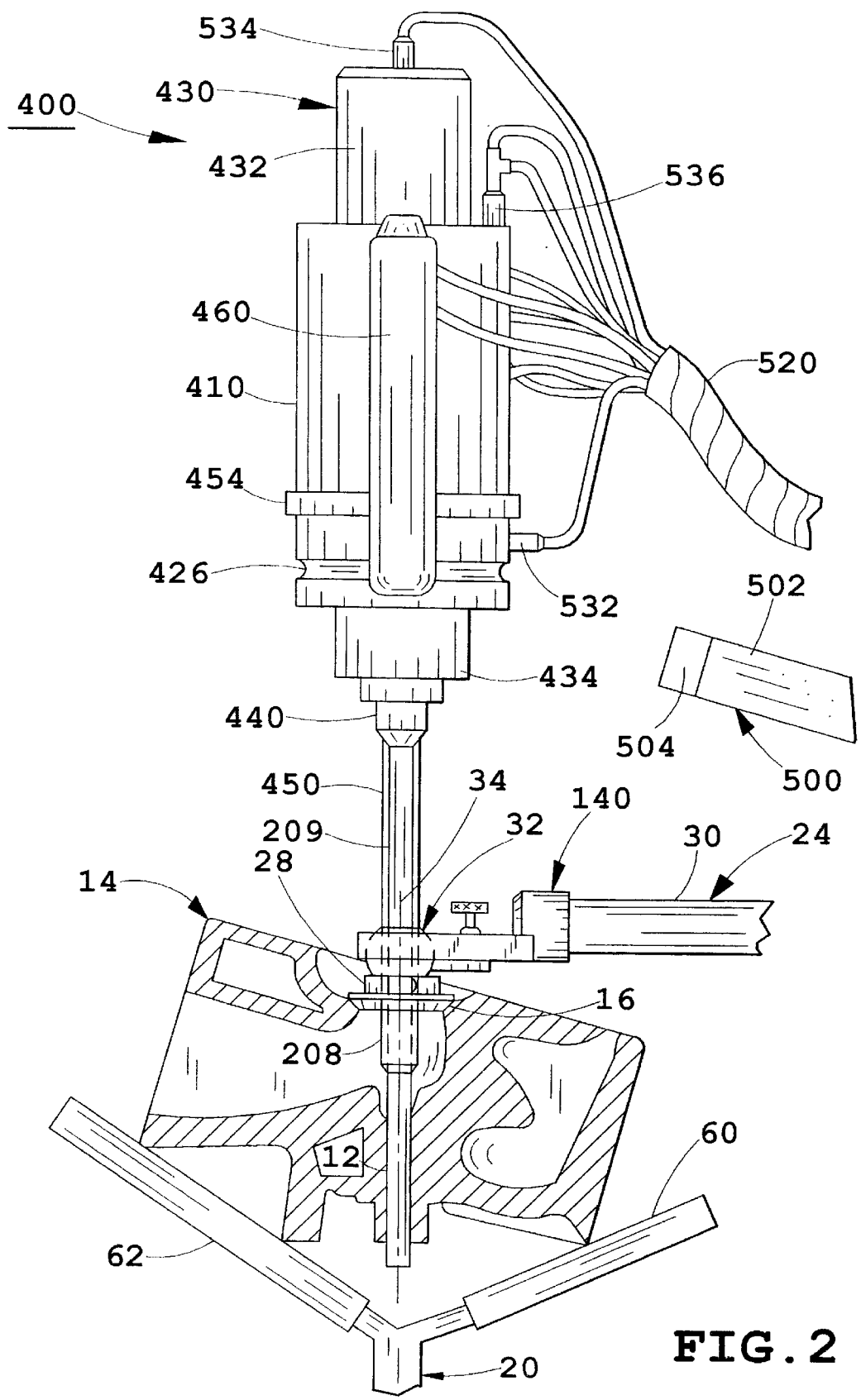
FIG. 2 is a fragmentary, side cross-sectional view of the valve guide boring fixture clamped in place on a cylinder head during the alignment step with the boring device of the present invention.

For purposes of description herein, the terms "upper," "lower," "right," "left," "rear," "front," "vertical," "horizontal," and derivatives thereof, shall relate to the invention as oriented in FIG. 1. However, it is to be understood that the invention may assume various alternative orientations, except where expressly specified to the contrary. It is also to be understood that these specific devices and processes illustrated in the attached drawings and described in the following specification are simply exemplary embodiments of the inventive concepts defined in this specification. Hence, specific dimensions and other physical characteristics related to the embodiments disclosed herein are not to be considered as limiting, unless expressly stated otherwise in any claim supported by this description.

A first embodiment of the boring system of the present invention is shown in FIG. 1 as including a fixture device 10 to which a boring device 400 is operably attached. The boring system further includes the cradle arm 500 attached to fixture device 10 and an air logic box 600 including the air logic illustrated in FIG. 13. The fixture device 10, which includes all the elements shown in FIG. 1 with the exception of boring device 400, cradle 500, and air logic box 600, is described in detail below and in U.S. Pat. No. 5,281,057.

Fixture Assembly

A fixture 10 (FIGS. 1 and 2) embodying the present invention is provided for reworking valve guides 12 in a cylinder head 14 of an internal combustion engine (not shown). In particular, fixture 10 facilitates the reboring of a worn valve guide so that a valve guide insert such as is disclosed in commonly assigned U.S. Pat. No. 4,768,479 or in U.S. Pat. No. 5,249,555, can be inserted into the bored valve guide. Cylinder head 14 includes a valve seat 16 corresponding to each valve guide 12. Fixture 10 is provided with a unique alignment member 28 adapted to engage valve seat 16. A partial universal joint 32 on fixture 10 allows fixture 10 to maintain alignment of the alignment member 28 with the central axis 34 of valve guide 12 as alignment member 28 is biased against valve seat 16 despite any flexing of fixture 10. Optimally, alignment member 28 includes a bore 36 that allows successive tools and/or bushings to be inserted through alignment member 28 into engagement with valve guide 12 without disengaging alignment member 28 from valve seat 16, thus providing improved alignment during the process of reworking the valve guide.

Fixture 10 (FIG. 1) includes a frame 18 with upright supports 20 for holding cylinder head 14, a carriage 22 laterally movable on frame 18, and an arm 24 movably attached to carriage 22 and extending forwardly over supports 20. A biasing cylinder 26 is operably attached to frame 18 to bias arm 24 toward cylinder head 14 held on supports 20. Cylinder 26, preferably an air cylinder, includes a spring retractor such that arm 24 can be moved free upwardly once the cylinder is depressurized.

An alignment member 28 is mounted for limited universal movement to the free end 30 of arm 24 and adapted to engage valve seat 16. Alignment member 28 is mounted to arm 18 at universal joint 32, which, in the preferred form, is a ball-and-socket arrangement Universal joint 32 communicates balanced forces therethrough so that as the alignment member 28 seats against a selected valve seat 16 of cylinder head 14, arm 24 exerts a continuously-balanced force on alignment member 28 regardless of the angular movement in any direction of alignment member 28, arm 24, or cylinder head 14 due to flexing of fixture 10.

In particular, frame 18 (FIG. 1) includes upright sidewalls 42, 44 that are securely attached to a base plate 46. A tool holster or holder 45 is shown attached to the side wall 42 for convenience of the operator. Two rods 48 and 50 and a stabilizer bar 52 extend between and are securely attached to sidewalls 42, 44. Rod 48 extends across the front of frame 18 and bar 52 extends across the rear of frame 18. Bar 52 is slightly lower than rod 48. Rod 50 extends across the rear of frame 18 a distance above bar 52. The illustrated frame 18 can be placed on a workbench or the like. It could also be attached to a wheeled cart or other movable means as needed to meet the portability requirements of the particular location of use.

A pair of cylinder head supports 20 is independently slidably mounted on front rod 48 by bearings 54 so that supports 20 can be slidably moved laterally to a desired spacing. Supports 20 each include an inverted T-shaped bracket including a lower, substantially horizontal bar 56 that spans between bearing 54 and rear bar 52, and a substantially vertical bar 58 connected to horizontal bar 56. Supports 20 also include an L-shaped cylinder head cradle having a rearwardly angled leg 60 and a forwardly angled leg 62. Legs 60, 62 can be covered with a spongy or rubber-like material to more securely hold cylinder head 14 thereon. As shown, supports 20 are shaped to loosely hold a variety of different styles of cylinder heads. However, it is contemplated that the cradle can be designed to securely retain a particular cylinder head design if so desired.

Figure 4:
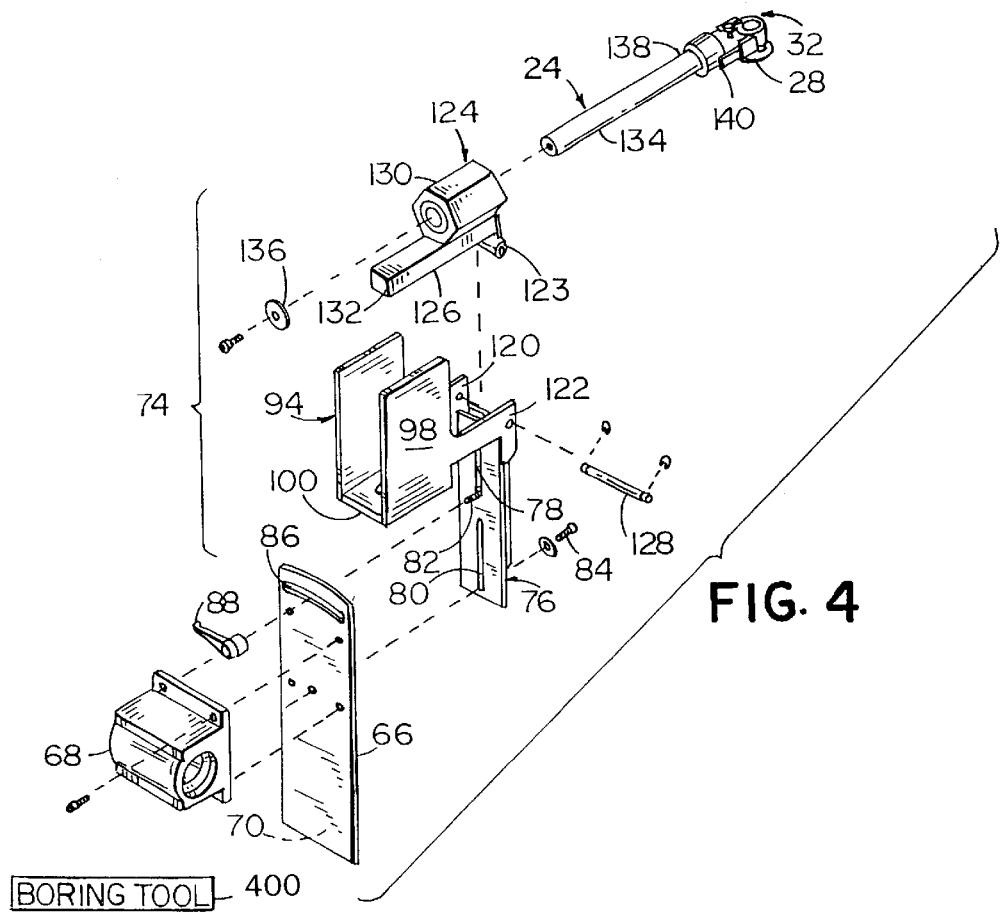
FIG. 4 is an exploded, rear perspective view of the carriage and arm of the fixture device shown in FIG. 1.
Figure 5:
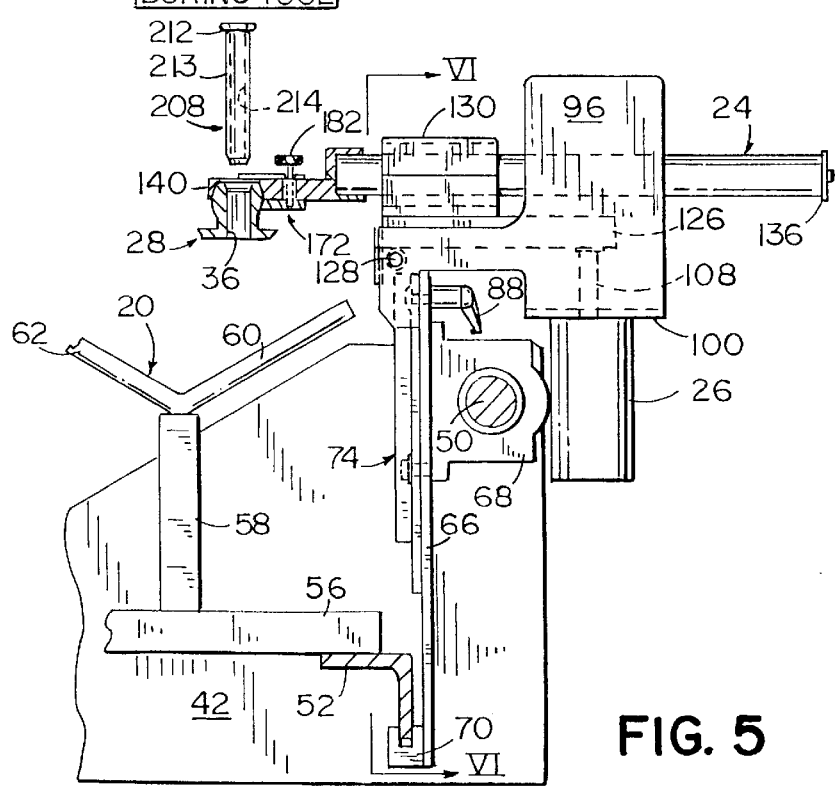
FIG. 5 is a fragmentary, side-elevational cross-sectional view of the fixture device shown in FIG. 1.
Figure 6:
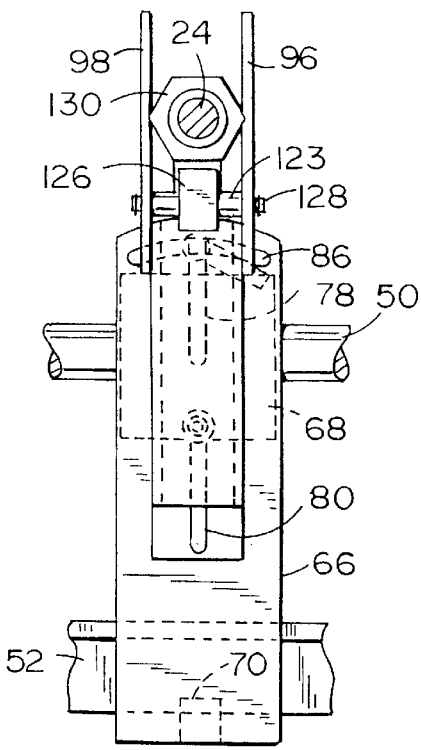
FIG. 6 is a front-elevational, cross-sectional view taken along the plane VI—VI in FIG. 5 with several hidden lines having been removed for clarity.
Figure 8:
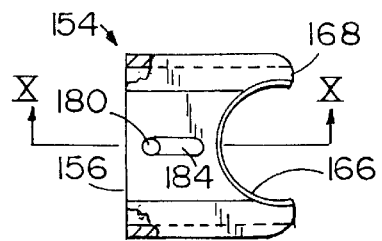
FIGS. 8–10 are various views of a ball retainer shown in FIG. 7.
Figure 9:
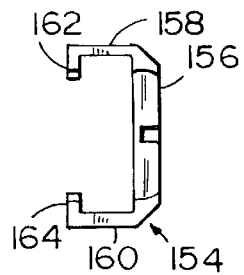

Carriage 22 (FIGS. 4–6) includes a vertical bearing member 66 connected to upper rod 50 by a bearing 68. Member 66 includes a lower, C-shaped catch 70 (FIG. 5) slidably engaging rear stabilizer bar 52 to retain member 66 in a substantially vertical position. Member 66 can be slidably moved from side-to-side as needed to position arm 24 over a selected valve guide 12 to be reworked.

Carriage 22 further includes an arm holder 74 vertically slidably attached to bearing member 66. In particular, arm holder 74 includes a vertical tubular post 76 with two slots 78, 80 located on a rearward side for receiving studs 82, 84, respectively. Member 66 further includes an arcuate slot 86 (FIG. 6) for receiving upper stud 82, arcuate slot 86 cooperating with vertical slot 78 and tubular post 76 to allow angular movement of arm holder 74 with respect to member 66 about lower stud 84. A handle 88 includes a bore threaded to receive upper stud 82. By twisting handle 88, stud 82 can be loosened and arm holder 74 can be lifted, lowered, or tilted as desired.

Arm holder 74 (FIGS. 4–6) includes an upper bracket 94 formed by sidewalls 96, 98 that are welded to horizontal plate 100 and to tubular post 76. The pneumatic cylinder 26 (FIG. 5) is attached to the undersurface of plate 100 with piston/rod 108 extending upwardly through a suitable aperture in plate 100. Rod 108 is normally retracted, but extendable when compressed air is supplied to cylinder 26.

Sidewalls 96, 98 also include forwardly located flanges 120, 122 (FIGS. 4–6) which extend upwardly from and are affixed to tubular post 76. A linear bearing subassembly 124 includes a pivot bar 126 pivotally mounted on pivot pin 128 between flanges 120, 122 by a tube 123. Linear bearing 130 is mounted to the top of pivot bar 126. Pivot bar 126 extends rearwardly at 132 to extend over extendable cylinder rod 108, so that rod 108 can bias pivot bar 126 and linear bearing subassembly 124 (as well as arm 24) counterclockwise (FIG. 5) when rod 108 is extended. Arm 24 includes a rod-like body 134, which extends through linear bearing 130, arm 24 being rotatable and forwardly and rearwardly slidable within bearing 130. Arm 24 has a stop washer 136 at its rearward end and an opposing free end 138, which extends forwardly over cylinder head 14 located on supports 20.

Figure 7:
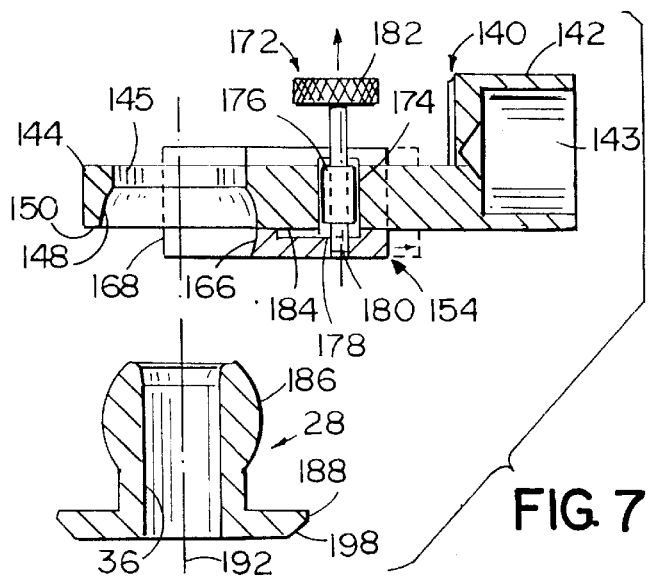
FIG. 7 is an enlarged, partially-exploded, cross-sectional view of the universal joint shown in FIG. 2.
Figure 10:
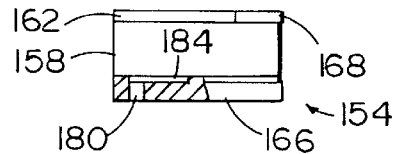

Socket bar 140 (FIG. 7) includes an enlarged rear end 142 with a bore 143 adapted to press-fittingly receive free end 138 of arm 24, and a socket section 144 extending forwardly from rear end 142. Socket section 144 has a substantially continuous, rectangular, cross-sectional shape and includes cylindrical aperture 145 extending downwardly and partially through its outer terminal end. Depending from aperture 145 in skirt-like fashion is a socket segment 148. Socket segment 148 is of a spherical nature and adapted to matingly receive spherical ball section 186 of alignment member 28 from the lower side 150 of socket section 144 as described below.

A U-shaped ball retainer 154 (FIGS. 7–10) is slidably mounted to the underside of socket section 144 with a crosspiece 156 resting against it. U-shaped ball retainer 154 further includes fingers 158, 160, which extend upwardly around the sides of socket section 144. Fingers 158, 160 include tips 162 and 164 that retain bracket 154 slidingly to socket section 144. Socket retainer 154 includes a mating socket segment 166 in the outer end 168 of crosspiece 156, which faces upwardly. Socket segment 148 and socket segment 166 together encapsulate ball section 186 when ball retainer 154 is in the position shown in FIG. 5. Ball retainer 154 can be moved rearwardly, opening the lower portion of the socket such that ball, segment 186 retained therein will be released and will drop out downwardly. A spring-biased, vertically slidable pin 172 (FIG. 7) is mounted in an aperture 174 in socket section 144. Pin 172 includes a tip 178 that enters a hole 180 in crosspiece 156 of ball retainer 154, but which is releasable by pulling upwardly on the head 182. In the pulled or retraced position, pin tip 178 is withdrawn far enough to release pin tip 178 from hole 180, but not far enough to release same from a slot 184 in retainer 154. Slot 184 extends a distance along retainer 154 and, since pin tip 178 remains engaged with slot 184 when retracted, slot 184 limits the travel of U-shaped bracket 154 as same slides on socket section 144.

Alignment member 28 (FIG. 7) is a one-piece part having an upper ball section 186 that is partially spherically-shaped, a lower valve seat engagement portion 188 that is frustoconically shaped and a stem 189 located interconnectingly therebetween. Alignment member 28 includes an upper end 191 and has an internal vertical bore 36 longitudinally extending through alignment member 28, which defines a centerline 192. Ball segment 186 is matingly engaged by the socket segments 148, 146 to form universal joint 32 and to affix alignment member 28 to the free end of arm 24. The spherical shape allows segments 148, 146 to apply pressure to alignment member 28 in a balanced and unbiased condition while allowing alignment member 28 to angularly move in any direction.

Lower valve seat engagement portion 188 of alignment member 28 is designed to operably engage and align with the bore of a selected valve seat 16. If fixture 10 flexes as cylinder 26 presses alignment member 28 into engagement with the seat 16, or if arm 24 otherwise moves with respect to valve seat 16, alignment member 28 can angularly adjust as needed to maintain a true alignment of centerline 192 with central axis 34. Arm 24 also adjusts linearly within linear bearing 130 if fore-to-aft linear adjustment of alignment member 28 is also required.

Alignment member 28 is designed to be as short as possible, so that the total distance from valve seat 16 to the underside of arm 24 (i.e., the height of alignment member 28) is minimized. This results in the arrangement being as stable as possible. Naturally, alignment member 28 must extend downwardly far enough so that arm 24 does not strike cylinder head 14 during use (see FIG. 2). In the preferred embodiment, a distance of about one inch or so has been found to be acceptable. Differently-sized alignment members 28 having differently-sized lower engagement portions 188 or different heights can be selected. For example, an intake valve seat is often sized differently than an exhaust valve seat. Each, of course, will ordinarily have same-sized ball segment 186. Socket retainer 154 permits quick changeover to the newly-selected alignment member 28 merely by raising pin 172, sliding the socket retainer rearwardly, replacing the alignment member and repositioning the socket retainer so that the ball segment 186 is again encapsulated for the partial universal movement noted.

Internal bore 36 (FIG. 5) of alignment member 28 is adapted to closely receive a removable precision-ground guide bushing 208. Use of precision-ground guide bushing 208 permits use of close tolerances, which improve accuracy during alignment, and boring of valve guide 12. Further, since guide bushing 208 is removable, different inner diameters can be chosen as they are needed. Guide bushing 208 is an elongate sleeve with an outer diameter 213 adapted to fit snugly but removably in bore 36 in alignment member 28 and an inner diameter 214 adapted to snugly receive tools to be passed therethrough. Guide bushing 208 also includes a head 212 which abuts the top of alignment member 28 to retain the guide bushing 208 in bore 36.

Prior to energizing cylinder 26, carriage 22 and arm 24 are manipulated so that a proper alignment member 28 overlies the seat of the valve guide upon which work is to be done. An alignment pin 209 (FIG. 2) is then extended through the inner bore of guide bushing 208. Alignment pin 209, as shown, may take the form of a separate tool having an upper shank diameter adapted to closely engage bushing 208 and a lower, tapered shank diameter optimally shaped to find the center of the worn valve guide 12 to be reworked. Preferably, however, the reamer is used as the alignment pin in the same fashion as shown in the aforenoted Hungary Patent Publication 53832, filed May 16, 1989. The reamer has a pilot sized so as to locate the centerline of the valve guide. The shank of the reamer is closely embraced by the interior diameter of a bushing. Once alignment has been achieved, cylinder 26 is activated to bring alignment member 28 into firm engagement with valve seat 16 to securely and finally locate alignment member 28. The reamer is then run through the worn valve guide to bore it to the desired size.

Bore 36 of alignment member 28 can be used to assist in aligning an insertion tool for press-fittingly installing a valve guide insert into the selected valve guide 12. Still further, a broaching tool (not shown) can be placed through bore 36 and used to broach the newly-installed insert to a proper inner diameter without the need to move arm 24 out of the way. A patent describing one such broaching tool is U.S. Pat. No. 4,573,340, and a tool and method for installing valve guide inserts generally is disclosed in U.S. Pat. No. 3,828,415.

Having described the fixture and interrelationship of parts, the use and advantages of the fixture will become apparent to a person of ordinary skill in the art. In use, fixture 10 is set up with the properly-sized alignment member 28 connected to arm 24 and retained thereto by ball retainer bracket 154 at universal joint 32. Supports 20 are spaced an appropriate distance apart, and a cylinder head 14 is placed thereon, with the valve seats 16 facing upwardly. Carriage 22 is moved laterally and arm 24 extended or retracted so as to position alignment member 28 over a selected valve guide 12. Also, arm holder 74 can be adjusted vertically and tilted angularly from side-to-side as needed by loosening and later retightening handle 88.

With arm 24 properly positioned, tool 400 is utilized in the manner previously described to align the axes of bore 34, the bushing, and reamer 310 with the axis of the worn valve guide. Cylinder 26 is then actuated by depressing an actuation switch, which causes compressed air to be communicated to cylinder 26 and in turn extend rod 108 into pivot bar 126. As rod 108 pressingly engages pivot bar 126, this causes arm 24 to bias alignment member 28 into tight engagement with the selected valve seat 16 corresponding to the selected valve guide 12. As arm 24 is thus biased, the resulting forces generated thereby cause fixture 10 to flex. The amount of flex depends upon the location of carriage 22 on rods 48, 50, and bar 52, and also the amount to which arm 24 is extended forwardly in linear bearing 130. Also, the amount of flexing movement depends upon other factors such as wear in any of bearings 54, 68, 130, the amount of pressure generated by cylinder 26 and the like.

Despite any flexing or other movement, alignment member 28 maintains its alignment with central axis 34 of valve guide 12 due to universal joint 32 and the ability of arm 24 to extend, retract, and rotate. This is because ball 186 of alignment member 28 rotates angularly within socket segments 148, 166 in any direction, and arm 24 extends or retracts fore or aft or rotates within linear bearing 130. Due to the spherical shape of universal joint 32, a balanced unbiased load is maintained on alignment member 28 regardless of the direction of angular movement. Also, due to the one-piece design of alignment member 28 and its minimized height, any undesirable play or looseness is substantially eliminated.

With alignment member 28 firmly held in place by cylinder 26, reamer 310 is moved downwardly through the valve guide to enlarge its bore. The reamer and attached bushing are then withdrawn. An insert insertion tool (not shown) can be extended through alignment member 28 into valve guide 12 to press-fittingly place a valve guide insert into the rebored valve guide 12 without moving arm 24. Subsequently, the insert insertion tool can be removed and a broaching tool can be inserted therethrough into the rebored valve guide bore 13, also without moving arm 24. Notably, boring tool 400, the insert insertion tool (not shown), and the broaching tool (not shown) can be inserted in succession through bore 34 and a suitable bushing without disengaging alignment member 28 from valve seat 16. Thus, improved alignment and productivity can be attained. Once all operations requiring alignment of bore 34 with the valve guide have been completed, the pressure on cylinder 26 is released, allowing arm 24 to be repositioned and the operation repeated on a newly-selected valve seat 16.

As mentioned above, the boring system of the present invention includes the fixture device 10 as described in U.S. Pat. No. 5,281,057 with a few minor modifications. Specifically, fixture device 10 includes a cradle arm 500 that is fixed to side wall 96 of upper bracket 94. Cradle arm 500 has the shape as shown in FIG. 3, and is provided to allow boring device 400 to be supported relative to fixture device 10 when not in use. As shown in FIG. 3, cradle arm 500 includes an elongated plate 502 that is bolted to side wall 96. Elongated plate 502 has a generally "L" shape with two protruding extensions 504 and 506 forming a notch 510, in which boring fixture 400 may be supported when in a non-used position. It will be appreciated that cradle 500 may be configured in different shapes, such as with a "V"-shaped notch, provided it can serve the function of supporting boring device 400.

As an additional modification, the boring system of the present invention includes an air logic box 600 that is mounted on opposing side wall 98 of upper bracket 94. Further, the clamp/unclamp actuation switch that had been previously provided on side wall 98 has been replaced with switches that are provided on the handles of boring device 400, as will be explained in detail below. With these limited exceptions, fixture device 10 is otherwise unmodified from the structure defined and described in U.S. Pat. No. 5,281,057. Having set forth the modification to fixture device 10, a boring device 400 of the first embodiment is described in detail below with reference to FIGS. 1, 2, 11, and 12.

First Embodiment

Figure 12:
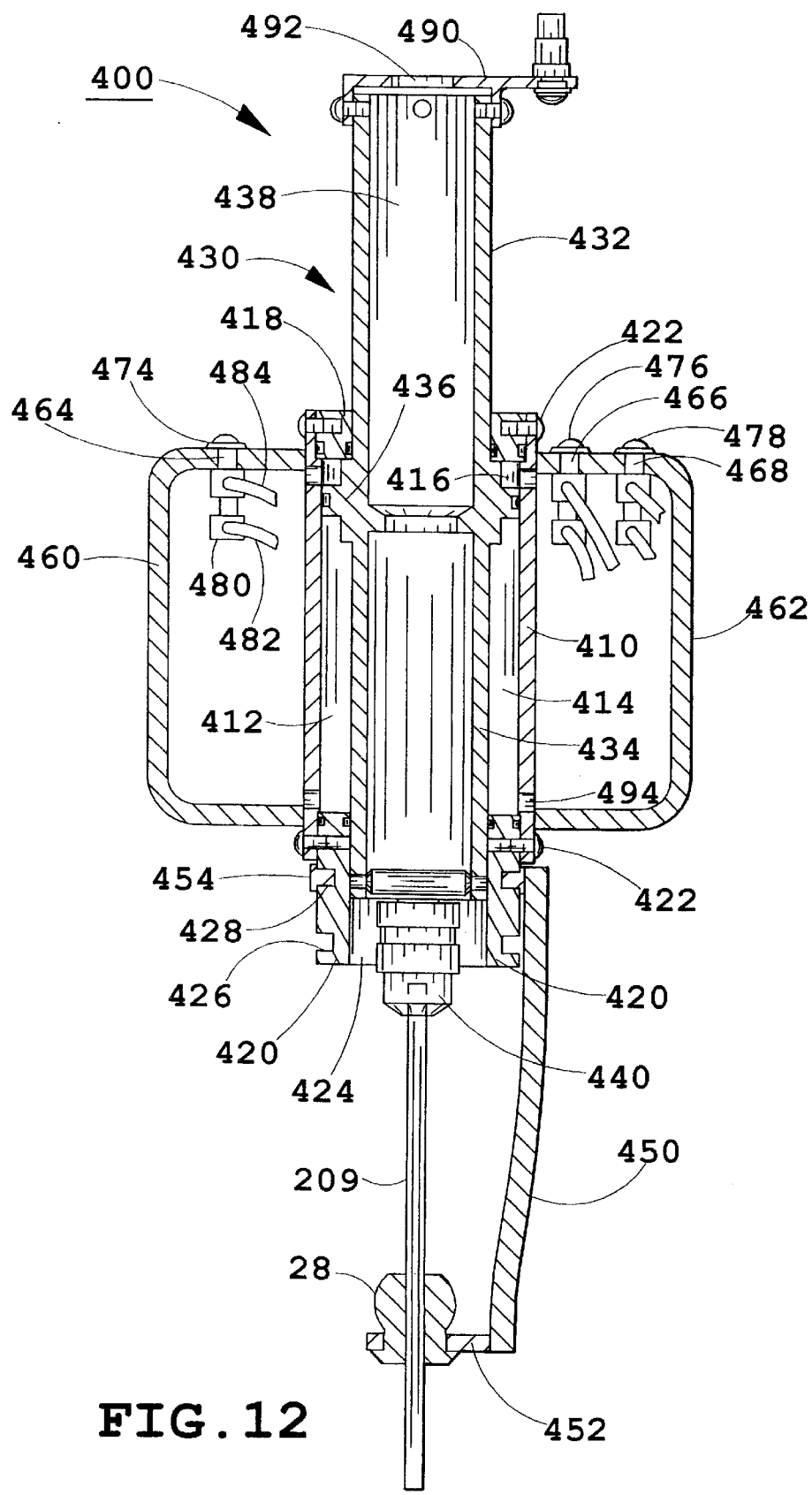
FIG. 12 is a partial cross-sectional view of the boring device of the present invention.

Referring initially to FIG. 12, boring device 400 includes a tool housing 410 that is preferably generally formed as a hollow cylinder to define a chamber 412 in its interior for slidably receiving a cylindrically-shaped pneumatic drill 430. The ends of chamber 412 are provided with annular seals 418 and 420 having an outer diameter that conforms to the inner diameter of tool housing 410 and an inner diameter corresponding to the outer diameter of cylindrical drill 430.

Cylindrical drill 430 includes an upper casing 432 and a lower casing 434 that are separated by an annular flange 436 provided approximately mid-way along the axial length of cylindrical drill 430. Annular flange 436 extends radially outward from the casing of drill 430 and has an outer diameter corresponding to the inner diameter of tool housing 410. Flange 436 is preferably configured to provide a seal within chamber 412 thereby dividing chamber 412 into a lower chamber 414 and an upper chamber 416. By providing such a seal, drill 430 may be slid axially within tool housing 410 by the flow of pressurized air into or out of upper or lower chambers 414 and 416. Annular flange 436 also serves to provide a stop for limiting the axial movement of drill 430 relative to tool housing 410.

Upper and lower seals 418 and 420 are fixed to tool housing 410 by means of screws or bolts 422. Lower seal 420 is configured to extend downward beyond the lower edge of tool housing 410 to provide a guide channel 424 for the lower casing 434 of drill 430. The portion of lower seal 420 that extends below tool housing 410 also serves to provide first and second circular grooves 426 and 428 to which a circular clamp 454 may be selectively engaged for securing a clamp arm 450 in a fixed position relative to tool housing 410. Clamp arm 450 is provided with a holding collar 452, which is secured about the neck of an alignment member 28 of fixing device 10. By selecting one of circular grooves 426 or 428 to secure clamp 454, the distance between tool housing 410 and the cylinder head may be adjusted to thereby give a greater range through which the depth of the bore may be selected.

The detailed construction of a preferred holding collar 452 is shown in FIG. 11. Preferably, holding collar 452 includes two semicircular portions 455 and 456 that are pivotally attached at one end by a pivot pin 457 and are fixedly secured to one another at the other end using a threaded screw 451 that passes through a through-hole in semicircular portion 455 for engagement in a threaded hole 459 in an end of semicircular portion 456 opposite the hinged end. Semicircular portion 456 is preferably provided with a flat surface 458 on its outer surface for being fixedly attached to clamp arm 450. With this construction, holding collar 452 may be releasably attached to alignment member 28 of fixture device 10. By providing the rigid attachment between alignment member 28 and boring tool 400, guide bushing 208 illustrated in FIGS. 2 and 5 may be eliminated and a central axis C (FIG. 12) of boring device 400 will be aligned with the central axis of the valve to be bored when alignment member 28 is brought into aligned engagement with the cylinder head through the clamping action of fixture device 10 in the manner described in detail in U.S. Pat. No. 5,281,057.

Drill 430 is preferably a pneumatic drill having a chuck 440 for releasably engaging a reaming shaft 209 that passes through a central bore in alignment member 28. Drill 430 preferably rotatably drives chuck 440 in response to a flow of pressurized air into an inner chamber 438 of drill 430 in a conventional manner. Such rotation of chuck 440 occurs without resulting in a rotation of the casing of the drill. As will be described in detail below, as pressurized air is applied to drill 430 causing chuck 440 and reaming shaft 209 to rotate, pressurized air is preferably provided to upper chamber 416 within tool housing 410 causing drill 430 to move axially downward within chamber 410 thereby pushing reaming shaft 209 downward through the valve guide in the cylinder head. By adjusting the duration in which air is supplied to upper chamber 416, the depth into which reaming shaft 209 is inserted into the valve guide may be selectively adjusted. Further, when drill 430 has moved axially downward by the selected amount, pressurized air may be supplied into lower chamber 414 of tool housing 410 thereby automatically repositioning drill 430 in its uppermost position so as to be ready to ream the next valve guide in the cylinder head.

As shown in FIG. 12, boring tool 400 preferably includes two handles 460 and 462 provided on opposite sides of tool housing 410 in parallel with the central axis of the boring device. By providing such handles in this orientation, a worker may grasp the handles and hold onto the boring device 400 in an ergonomically-correct position with the palms of both hands facing one another. Because boring device 400 automatically applies a downward pressure on drill 430 through pneumatic control, the worker is not required to assert a downward force on handles 460 and 462, but rather only needs to firmly grasp these handles to prevent vibrational rotation of the boring device and to be able to freely manipulate the control switches that are provided on an upper leg of handles 460 and 462. As described below, the worker using the worker's thumb may manipulate these switches while still firmly grasping handles 460 and 462 with his or her remaining fingers.

As shown in FIG. 12, three switches (474, 476, and 478) are mounted in respective through holes 464, 466, and 468 provided through the upper legs of handles 460 and 462. These switches are air switches that, when actuated, move a plunger within body 480 of the switch to open a valve allowing the flow of air supplied from an air supply input line 482 to pass through switch body 480 and out through an air supply output line 484. The air supply lines are connected to air logic box 600 as shown in FIG. 2 through a channel provided in a flexible hose 520 provided to prevent tangling of the air lines and to otherwise protect the air lines from damage. Switch 474 is preferably provided to actuate a clamping mechanism in fixture device 10 that was previously controlled through an air switch mounted to a rear portion of fixing device 10. Switch 476 is provided to preferably control the unclamping action by fixing device 10, and switch 478 is provided to preferably initiate the drilling cycle wherein pressurized air is provided to upper chamber 438 of drill 430 through inlet 534 (FIG. 2) causing rotation of reaming shaft 209, and to upper chamber 416 through inlet 536 to drive reaming shaft downward into the valve guide, and wherein pressurized air is subsequently supplied into the lower portion of chamber 414 through inlet 532 to drive reaming shaft 209 upward out of the valve guide at the end of the cycle.

Figure 13:
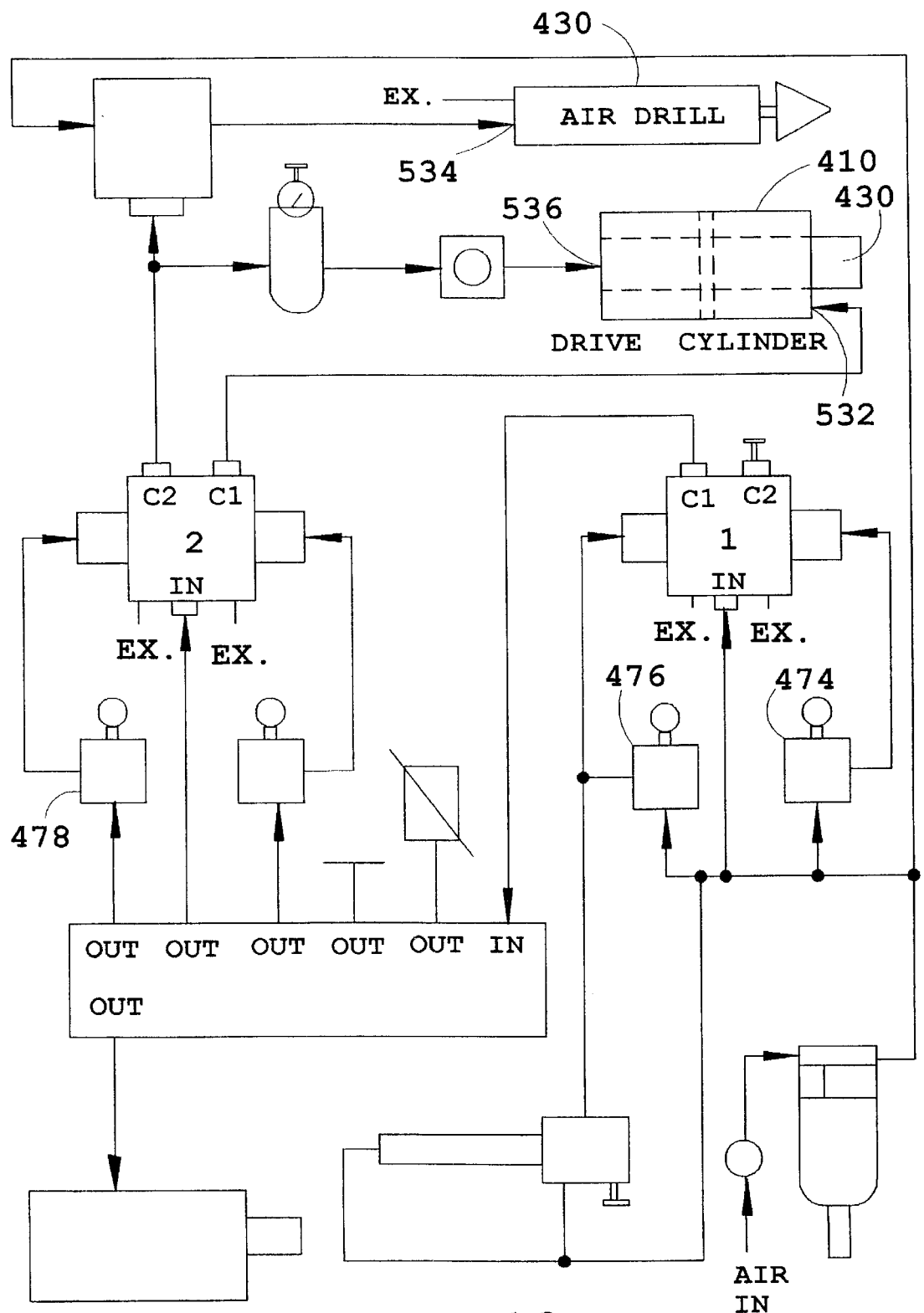
FIG. 13 is a block diagram illustrating the air control logic employed in the boring system of the present invention.

As shown in FIG. 13, switches 474 and 476 enable the supply of air from an air source to pass through a bottom unit 1 to a manifold. When air is supplied to the input of the manifold, air is supplied to a clamping cylinder of fixture device 10 causing the fixture device to clamp into alignment with the valve guide. Also, air is provided through the output to top, unit 2. Air is not-output from top unit 2, however, until switch 478 is activated at which point, air is provided through output C2, which is connected to an input of an air valve between the air input supply line and inlet 534 of the air drill 430. This supply of air enables air to be supplied to the air drill thereby rotating chuck 440 and reaming shaft 209. At this same time, air is supplied through a regulator and flow control device to the upper chamber 416 within tool housing 410 via inlet 536. After a predetermined selectable time period has expired, the air supplied through C2 is shut off and air is supplied through C1 to the bottom chamber 414 in tool housing 410 via coupling 532. By providing switches 474 and 476 to enable the supply of air to the manifold in the first instance, the cycle switch 478 cannot enable the drill to operate and thus be forced downward until the fixture mechanism has clamped alignment member 28 into position on the valve seat.

The air logic box further includes a momentary valve that serves as a safety disconnect in the event that the supply of pressurized air to the boring system is interrupted when boring device 400 is in a clamped state. If the shop air supply is interrupted or falls below an adequate pressure level, the momentary valve causes the fixture device to enter the unclamped state so that when the air supply is later continued, the boring device will not be jerked into an upright clamped position.

To operate the boring system of the present invention, a user first swings the support arm 24 so that it clears the engine head and so that there is no interference when the fixture device 10 is in a clamped position. With the alignment member 28 positioned on the valve seat, and with the boring device 400 in a generally-vertical position, the user presses the clamp switch 474 actuating the clamp assembly on the fixture device. Then, the user may adjust the stroke stop to ½ inch greater than the depth of the valve guide that is to be reamed. If the stroke is set too long, the reamer may extend too far past the bottom of the valve guide during operation and then get caught up on the lip of the reamed hole during retraction thereby damaging the reamer. Next, the user presses the cycle switch 478 to actuate drill 430 and providing pressurized air to upper chamber 416 thereby driving the drill axially downward in tool housing 410. During this time, the valve guide is automatically reamed.

The air flow may be adjusted by manipulating a flow control knob on air logic box 600 to prevent drill 430 from stalling. Adjusting this knob increases and decreases the feed rate of boring device 400. In a preferred embodiment, the drill speed is fixed to 1700 rpm at 90 psi (minimum) of air pressure with 100 psi recommended.

After the reaming cycle is completed, the user then pushes the unclamp switch 476 and moves boring device 400 to position it over the next valve guide on the engine head. The process is then repeated for each valve guide to be reamed.

Second Embodiment

Figure 14:
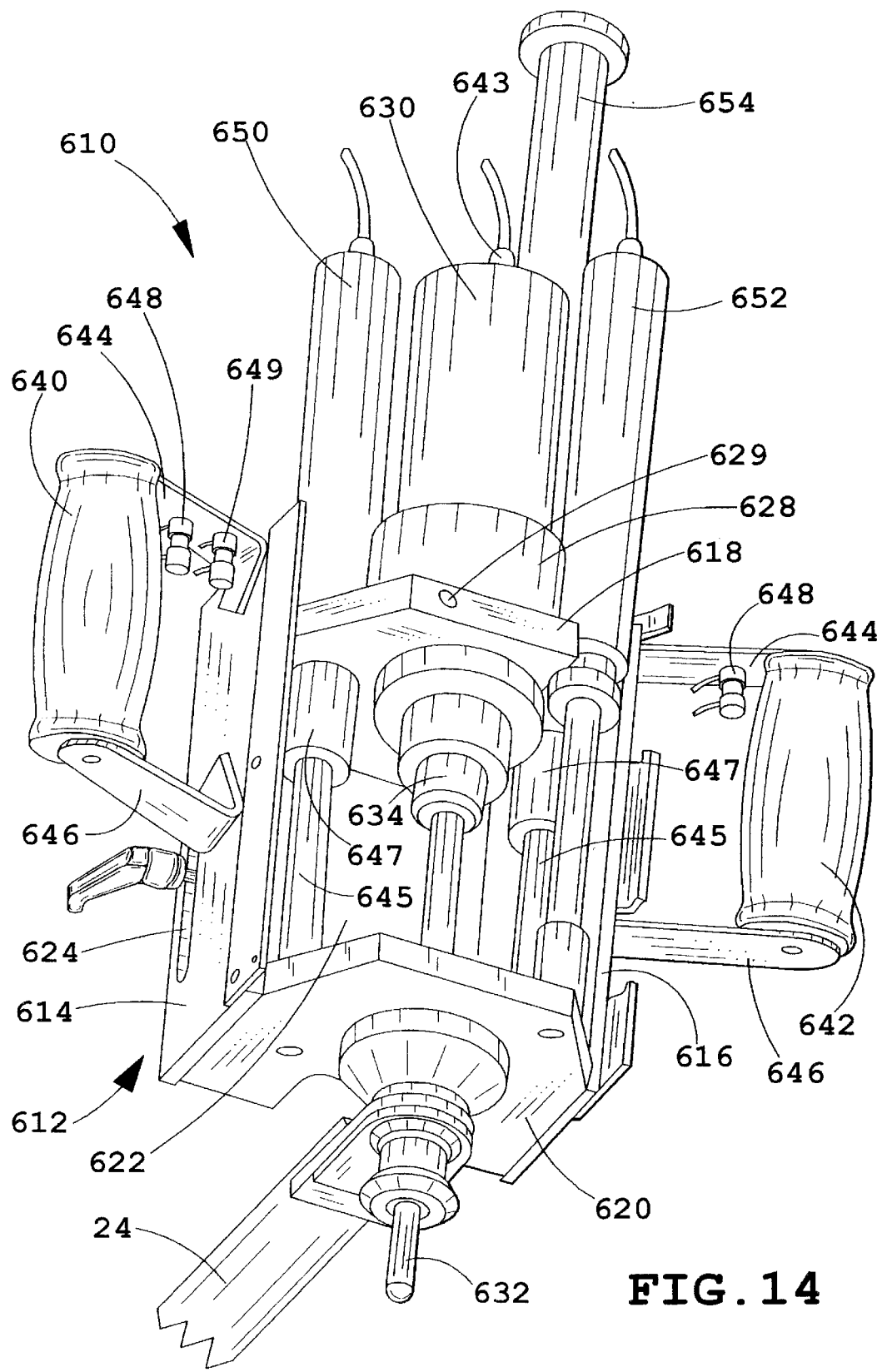
FIG. 14 is a perspective view of the front of a boring device constructed in accordance with a second embodiment of the present invention.

A second embodiment of a boring device 610 of the present invention is shown in FIG. 14. Boring device 610 includes a tool housing 612 with two upstanding walls 614 and 616, an upper plate 618, and a lower plate 620. Upright walls 614 and 616 are generally vertically oriented, while upper plate 618 and lower plate 620 are both generally horizontally oriented, fitting in between walls 614 and 616. Upstanding walls 614 and 616, in relation with the spacing between plates 618 and 620, define an interior space 622, which allows various parts of the boring device 610 to be positioned therein and allows downward movement of upper plate 618. Lower plate 620 is fixedly attached to both upright walls 614 and 616, while upper plate 618 is not fixedly attached, thereby allowing vertical movement of upper plate 618 between upstanding walls 614 and 616 during the boring cycle. Upstanding wall 614 further includes an adjustment slot 624, which is discussed in further detail below. Tool housing 612 also includes a removable front safety cover 626 (FIGS. 15–17) which can be made of any durable substance and is used to protect the user from pinching and other safety hazards associated with the boring device.

Figure 15:
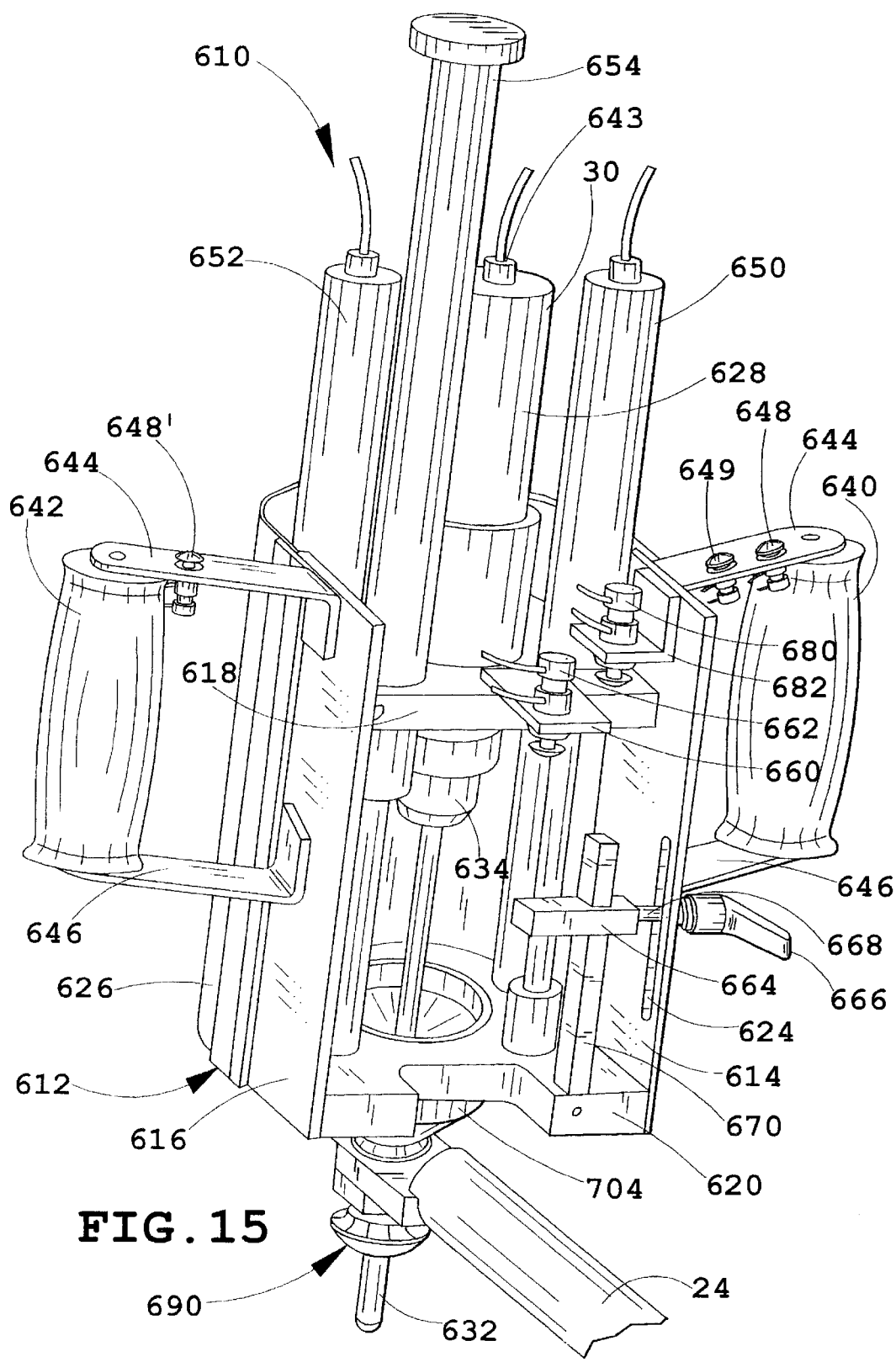
FIG. 15 is a perspective view of the back side of the boring device of FIG. 14.
Figure 16:
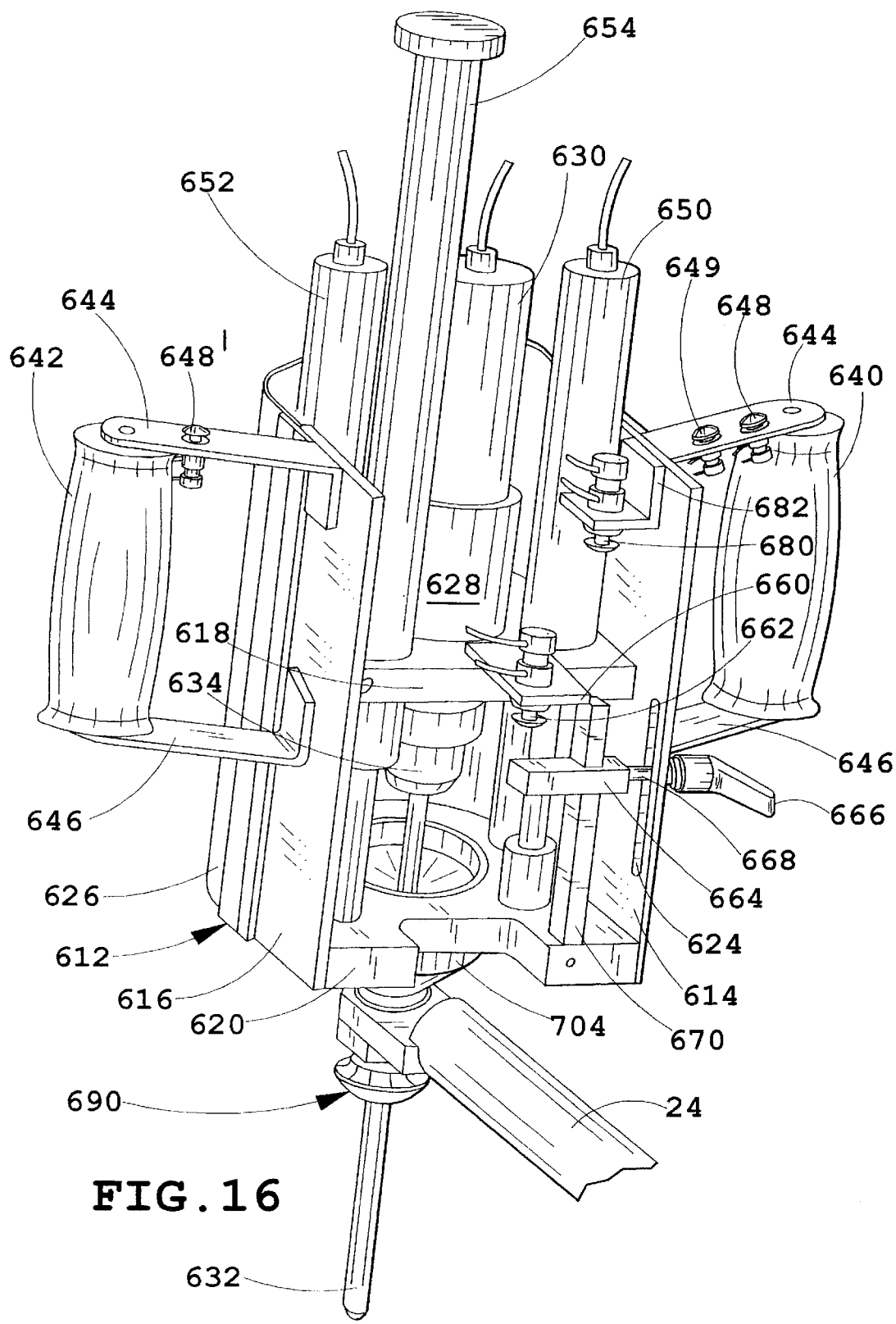
FIG. 16 is a perspective view of the back side of the boring device of FIG. 14 near the end of its downward boring stroke.

Upper plate 618 includes a vertical bore (not shown), which is sized to allow a snug engagement with a drill collar 628. Drill collar 628 is attached to the exterior of a pneumatic drill 630 and is removable from upper plate 618. The removability of drill collar 628 and drill 630 allows various sized cylindrical pneumatic drills having different outer diameters to be interchanged. FIGS. 14–16 show pneumatic drill 630 having such a drill collar 628, which in turn is inserted into upper plate 618. A set screw 629 and a tapered-in pin in upper plate 618 is used to hold drill collar 628 and thus pneumatic drill 630 in place by screwing the end of set screw 629 horizontally through upper plate 618 and against tapered-in pin and hence against drill collar 628. A quick-connect air line coupling 643 may be used to allow quick replacement of drills. Set screw 629 can be easily tightened or loosened to allow quick and easy replacement of the pneumatic drill 630 and drill collar 628.

By allowing different sized drills to be readily interchanged, a single boring device may be used for applications that otherwise would require a separate valve boring fixture assembly. For example, the lower-powered, higher RPM drills used to ream an existing valve guide liner may be interchanged with a higher-powered lower RPM drill for drilling larger bores to install larger diameter replacement valve guides. The ability to interchange such drills thereby exposes the boring device and fixture assembly to a wider market.

Pneumatic drill 630 includes a chuck 634 for receiving a reaming shaft or bit 632. Chuck 634 and reaming shaft 632 are located on the underside of upper plate 618 and extend below the bottom of drill collar 628. Drill collar 628 preferably has an axial length that is sufficient to allow vertical adjustment of drill 630 with respect to upper plate 618. In this manner, the pilot length at which reaming bit 632 extends below lower plate 620 and into a valve guide bore. By lengthening the pilot length of the reaming bit, the boring device may be more accurately axially aligned with the axis of the valve guide bore to be reamed, prior to clamping the seating adapter, and hence the boring device in place. The alignment may thus be so accurate as to allow the valve seat itself to be machined using a machine tool. By shortening the pilot length of the reaming bit, the boring device may more readily clear the top surface of the cylinder head when moving the boring device from one valve guide bore to another. Hence, the pilot length may be readily adjusted by loosening and tightening the set screw to best accommodate the cylinder head being worked upon.

Tool housing 612 has attached to it two handles 640 and 642 which each have an upper bracket 644 and a lower bracket 646 for attachment of the handle to tool housing 612. Preferably, the upstanding walls of the tool housing have multiple holes through which handles 640 and 641 may selectively be attached in order to enable the user to adjust the relative positioning and angle of the handles. The handles may also have a soft grip to reduce fatigue. Upper brackets 644 each include two holes through them (not shown), which allow attachment of pneumatic switches 648 and 648', which must be pressed simultaneously to clamp the device in position with respect to the valve bore to be reamed, and a pneumatic switch 649, which may be pressed by the user to initiate rotation of reaming shaft 632 and vertical movement of pneumatic drill 630.

Boring device 610 also includes two air cylinders 650 and 652, which use pneumatic pressure to move the upper plate 618, and thus pneumatic drill 630, downward through the downward boring stroke when air is supplied to bottom inlets thereof. Cylinders 650 and 652 further use pneumatic pressure to raise (retract) upper plate 618, and thus pneumatic drill 630, when air is supplied to top inlets thereof. Air is supplied to the top inlets once the device is triggered at the end of its downward stroke, which is further discussed in detail below. A cylindrical dashpot 654 is vertically oriented and attached to upper plate 618. Dashpot 654 is used selectively to dampen the movement of the upper plate and thus allows adjustment of the speed of boring, without the need to tap into or change the air pressure of the system.

The boring device may also include a pair of vertical shafts 645 fixed to lower plate 620 and extending upward through apertures in upper plate 618. Bearings 647 are preferably fixed to upper plate 618 to slidably receive the shafts 645. By providing shafts 645 and bearings 647, upper plate 618 may smoothly slide up and down under control of cylinders 650 and 652.

FIG. 15 shows the backside of boring device 610. As shown in FIG. 15, lower plate 620 includes a bore extending through its entire thickness and has attached to its underside an extension 704, which receives reaming shaft 632. Connected to upper plate 618 is an attachment plate 660, which has attached to it an inverted switch 662. When switch 662 is pressed, it activates a pneumatic control which stops reaming shaft 632 from rotating, stops the vertical downward movement of pneumatic drill 630, and initiates retraction of the reaming shaft 632. Switch 662 comes in contact with an adjustable plate 664 at the end of the downward boring stroke. Adjustable plate 664 adjustably slides along a vertical post 670 that extends upward from the top surface of lower plate 620. The vertical position of adjustable plate 664 is changed by turning a handle 666, which engages a rod 668, which extends through adjustment slot 624 in tool housing 612 and is engaged with adjustable plate 664 to allow the vertical height of adjustable plate 664 to be changed and thereby change the distance at which the reaming bit travels during a boring cycle. In one arrangement, handle 666 is threaded onto rod 668 and rod 668 is fixedly attached to adjustable plate 664 such that rotation of handle 666 tightens and loosens handle 666 against side wall 614 thereby pulling plate 664 firmly against post 670. In an alternative arrangement, handle 666 may be fixedly attached to rod 668 and rod 668 may be threadably engaged with adjustable plate 664 so as to extend through plate 664 and selectively contact a side surface of post 670. A user can adjust the depth of the boring cycle by turning handle 666 counterclockwise, thereby loosening the engagement of rod 668 against post 670, moving adjustable plate 664 up or down as desired, and then retightening adjustable plate 664 to post 670 by turning handle 666 in a clockwise direction to tighten the engagement of rod 668 against post 670.

At the desired depth of the boring cycle, switch 662 comes in contact with adjustable plate 664 as shown in FIG. 16. Switch 662 activates a pneumatic control to switch off the air supply to pneumatic drill 630, and forces air into cylinders 650 and 652 so that drill 630 is returned to its starting position by raising upper plate 618.

Boring device 610 further includes an inverted unclamping switch 680, which is attached to upright wall 614 of tool housing 612 by an L-shaped bracket 682. Unclamping switch 680 is positioned so that when pneumatic drill 630 is returned to its starting position, upper plate 618 contacts unclamping and actuates switch 680, thereby causing an alignment member or seating adapter 690 to be unclamped from the valve seat through actuation of cylinder 26 (FIG. 5) of fixture 10. The arrangement of switches 662 and 680 is best shown in FIG. 20.

Figure 17:
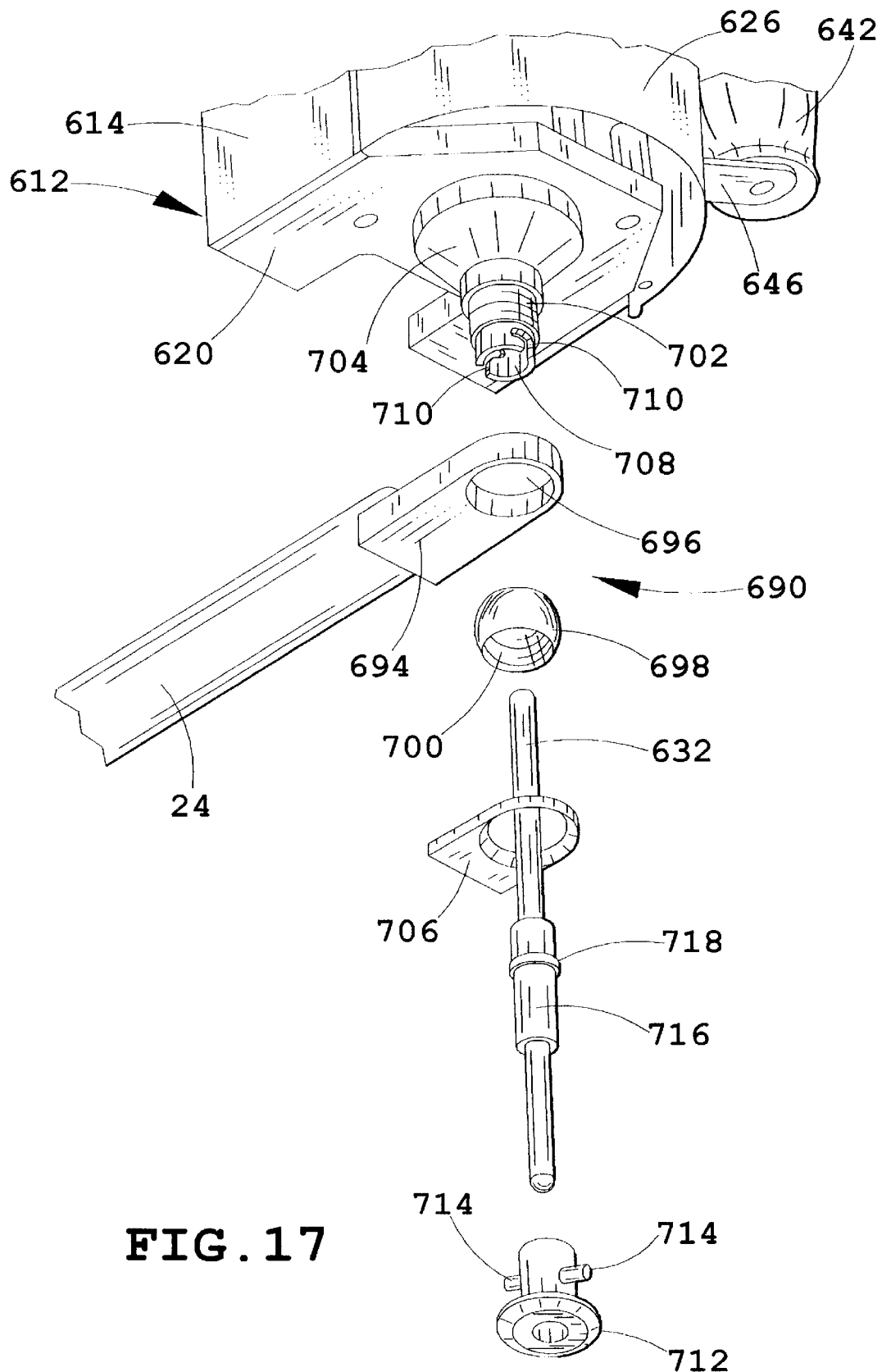
FIG. 17 is an exploded perspective view of the clamping mechanism of the present invention.

FIG. 17 shows the parts of the seating assembly 690 of the second embodiment of the present invention. The seating assembly of the present invention allows interchangeability of the seating without de-mounting the tool from the fixture. Hence, seatings of different sizes may be readily switched to accommodate different sized valve seats. Further, as will be apparent from the description below, the interchangeable seatings may be made of a much simpler and inexpensive construction thereby allowing a shop to have a greater inventory of such seatings at hand for use by the operators.

According to the second embodiment, fixture arm 24 has a socket bar 694 attached to it. Socket bar 694 has a bore 696 that is large enough to retain a ball section 698. Ball section 698 includes a reverse-threaded bore 700, which engages a threaded portion 702 on a cylindrically shaped housing extension 704. Seating assembly 690 is further equipped with a holding collar 706, which fits around the lower end of ball section 698. Once seating assembly is assembled, it serves to pivotally attach the boring device to the end of fixture arm 24.

Housing extension 704 includes a bore 708 which is large enough to receive an upper extension of seating 712, which, in turn, has a bore large enough to receive reamer bushing 716, which allows reaming shaft 632 to freely rotate. Housing extension 704 further includes inverted L-shaped slots 710 on either side. Valve seating 712 includes pins 714 on either side thereof to fit into slots 710 to hold the seating in place. As shown in FIG. 18, ball section 698 fits inside of bore 696 of socket bar 694. Ball section 698 is threadably engaged with the threaded portion 702 of the housing extension 704. Holding collar 706 fits over the bottom portion or neck of ball section 698 and valve seating 712 fits over the reaming shaft 632 and the bottom portion of an attached annular member 716 and engages with a ring 718 of annular member 716. Pins 714 (FIG. 17) fit into slots 710 and when valve seating 712 is pushed upward and turned counterclockwise, the engagement of pins 714 in slots 710 locks the seating tightly in place.

FIG. 19 shows an alternative adjustable cradle assembly of the fixture assembly of the present invention that may be used in place of cradle assemblies 20 described above. A pair of V-shaped cylinder head cradle supports 720 are fixedly attached to a substantially vertical bar 722. Bar 722 includes notches 724 on one side which are shaped to accept a pawl 726, which is fixedly attached to a handle 728 and pivotally attached by a pin to a cradle housing 730. As in the assemblies shown in FIG. 1, horizontal bar 56 has one end pivotally and slidably attached to cylindrical beam 48 and its opposite end adapted to be lifted from and resting upon, L-beam 52. This assembly allows a user to lift handle 728 to removing pawl 726 from a notch 724 in bar 722 and thereby unlock and enable vertical adjustment of cradle supports 720. The user may also release handle 728 letting gravity pull the handle downward and thereby engage a selected notch 724 in bar 722 to latch cradle support at a desired height. Such an adjustable fixture assembly allows the fixture to be used with a variety of different-sized cylinder heads while also allowing the boring device, which is secured to the fixture, to be moved horizontally above the cylinder head with sufficient clearance.

Figure 21:
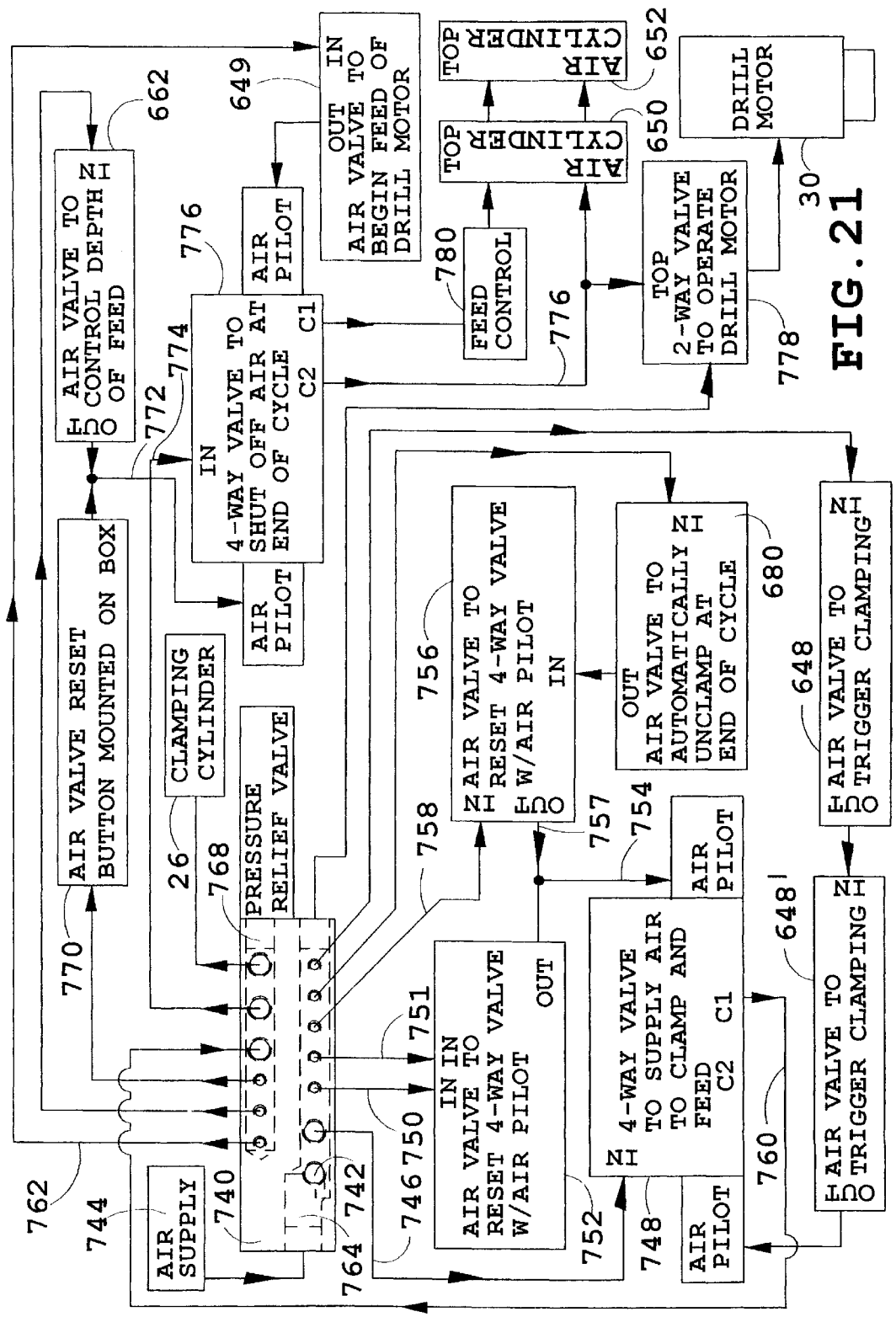
FIG. 21 is a functional block diagram of the air logic employed to control the boring device of the present invention.

FIG. 21 shows the air logic used for the present invention. The air logic of the second embodiment of the present invention is governed by an air logic manifold 740, which has numerous ports 742 for either receiving or discharging pressurized air. The air supply 744 supplies air into a first chamber 764 of manifold 740, which in turn forces air into line 746, which is connected to a four-way valve 748. Manifold 740 also allows entry of air into lines 750 and 751, which are both connected to an air valve 752, which resets four-way valve 748 with an air pilot, which is in turn connected to four-way valve 748 by line 754. Air valve 752 is provided to prevent four-way valve 748 from passing air and thereby clamping the boring device in a valve seat when the air supply 744 has been interrupted and then turned back on. In this manner, injuries may be avoided if an individual had his or her fingers at a pinch point when the supply of air resumed.

Manifold 740 also discharges air to a second air valve 756 via line 758. Valve 756 in turn outputs air to line 754 by line 757 to reset four-way valve 748 when switch 80 is actuated. By resetting four-way valve 748 when switch 80 is actuated, four-way valve 748 is prevented from allowing air to pass to clamping cylinder 26 thereby unclamping the boring device at the end of the boring cycle.

Air is further directed to switches 648 and 648'. When the air pilot in four-way valve 748 connected to switches 648 and 648' receives air (i.e., when both switches 648 and 648' are activated), air is permitted to exit four-way valve 748 by line 760, which in turn supplies air to a second chamber 768 of manifold 740.

Entry of air into second chamber 768 of manifold 740 allows air to be distributed to a number of destinations. Whenever air is supplied to second chamber 768, air is passed to clamping cylinder 26, which moves fixture arm 24 thereby clamping the seating in the valve seat. Air also allowed exits through line 762, which is connected to switch 49. When the user actuates switch 49, air passes through switch 49 to a pilot of a second four-way valve 766. When air is supplied to that pilot of four-way valve 766, valve 766 passes air supplied from second chamber 768 on line 774, out port C2. Air passing out of port C2 is supplied to the bottom inlets of cylinders 750 and 752 and to a two-way valve 773 thereby causing drill 730 to rotate reaming shaft 732 and causing cylinders 750 and 752 to pull upper plate 718 (and drill 730) downward toward lower plate 720.

Air also enters switch 62, which is used in combination with adjustable plate 664 to control the depth of the feed by supplying air to a second pilot of second four-way valve 766 when actuated. When air is supplied to this second pilot, four-way valve 766 halts the supply of air out port C2 and instead outputs air from port C1. The air from port C1 is fed through a feed control 780 to the top inlets of cylinders 750. Thus, when switch 62 is actuated, air is no longer fed to drill 730 in order to stop its rotation, and cylinders 750 and 752 reverse direction and push upper plate 718 upwards and away from bottom plate 720.

The air logic also includes an air valve reset button 770, which is also connected to the second pilot of the second four-way valve 766. Reset button 770 may be located on the air logic box 600 to allow a user to manually halt the rotation and downward stroke of the drill.

In operation, a user first adjusts the depth of the boring stroke by vertically adjusting adjustable plate 664 as described above. The user then aligns reaming shaft 632 with the valve guide and grabs handle 640 with the left hand and handle 642 with the right hand. Switches 648 and 648' are pressed using the thumbs of both hands while keeping both hands on handles 640 and 642. Air then is supplied to clamping cylinder 26 of the fixture device causing the fixture device to clamp the seating and hence the boring device into alignment with the valve guide. The user then presses switch 649 with the thumb of one hand causing chuck 634, and thus reaming shaft 632, to rotate and causing drill 630 to move downward. Drill 630 moves downward until switch 662 contacts adjustable plate 664, causing chuck 634 to cease rotation, drill 630 to stop downward movement, and drill 630 to begin retraction upward. Drill 630 is retracted upward until upper plate 618 contacts switch 680, causing upper plate 618 to stop and seating assembly 690 to become unclamped. Boring device 610 is then slid along the fixture to the next position on the cylinder head and the cycle is repeated.

As will be apparent to those skilled in the art, all these steps may be performed without requiring the operator to remove his or her hands from the handles. Thus, the boring device of the present invention allows much easier and quicker operation without requiring the operators to place their hands near any potential pinch points. Further, the lack of a need for continuous hand movements between each boring cycle on each valve to be bored, significantly reduces the risk of developing repetitive motion disorders such as carpal-tunnel syndrome.

The above description is considered that of the preferred embodiment only. Modifications of the invention will occur to those skilled in the art and to those who make or use the invention. Therefore, it is understood that the embodiment shown in the drawings and described above is merely for illustrative purposes and not intended to limit the scope of the invention, which is defined by the following claims as interpreted according to the principles of patent law, including the doctrine of equivalents.

What is claimed is:

1. A boring device comprising:
    a tool housing having a dimension large enough to encase a pneumatic drill;
    a pneumatic drill positioned substantially in said tool housing and including a removable reaming shaft;
    at least one handle attached to the exterior of said tool housing;
    a first pneumatic control for clamping said tool housing into alignment with a part that is desired to be bored; and
    a second pneumatic control for initiating downward movement of said drill and rotation of said reaming shaft.

2. The boring device of claim 1 wherein said at least one handle is two opposing handles and each said handle has attached to it a first switch, wherein simultaneous activation of said first switches engages said first pneumatic control.

3. The boring device of claim 1 wherein said tool housing includes an upper plate and a lower plate, said pneumatic drill removably attached to said upper plate, wherein said second pneumatic control selectively moves said upper plate downward and upward relative to said bottom plate.

4. The boring device of claim 3 and further including a dashpot attached between said upper and lower plates to allow adjustment of speed of movement of said pneumatic drill without changing air pressure.

5. The boring device of claim 3 and further including a seating assembly formed on said lower plate for physically attaching said tool housing to a fixture arm of a base fixture assembly and for engaging a valve seat of a valve bore to be reamed, wherein the base fixture has supports for supporting a cylinder head and the fixture arm extends over a cylinder head supported on the supports.

6. The boring device of claim 5, wherein said seating assembly includes a removable seating adapter for engaging a valve seat of a valve bore to be reamed.

7. The boring device of claim 1 and further including an air logic system to effect the downward movement of said drill and rotation of said reaming shaft when said second pneumatic control is activated.

8. The boring device of claim 1 and further including a deactivation switch and a stop plate, wherein said deactivation switch terminates rotation of said reaming shaft when said deactivation switch contacts said stop plate.

9. The boring device of claim 8 wherein said stop plate is adjustable vertically to allow adjustment of depth of a boring cycle.

10. The boring device of claim 9, wherein said deactivation switch further initiates retraction of said reaming shaft.

11. The boring device of claim 1 and further including a physically actuated unclamping switch to activate a pneumatic control that unclamps the tool housing from the part being bored.

12. A boring device comprising:
  a tool housing having an upper plate and a lower plate;
  a cylindrically-shaped pneumatic drill positioned substantially in a vertical orientation and attached to said upper plate, said cylindrical drill having a reaming shaft extending beyond said lower plate;
  two opposing handles mounted on said tool housing; and
  a pneumatic control for effecting rotation of said reaming shaft and vertical movement of said drill.

13. The boring device defined in claim 12 wherein one of said handles includes a switch mounted thereon, said switch activating said pneumatic control when pressed and thereby triggering rotation of said reaming shaft and movement of said cylindrical drill.

14. The boring device defined in claim 13 and further including:
  a stop plate mounted on said tool housing; and
  a deactivation switch attached to said upper plate in alignment to engage said stop plate mounted to said tool housing, when actuated by coming into contact with said stop plate, said deactivation switch controls said pneumatic control to stop rotation of said reaming shaft and retract said reaming shaft by moving said drill in an opposite direction.

15. The boring device defined in claim 14, wherein said stop plate is slidably adjustable, thereby allowing adjustment of depth of a boring cycle.

16. The boring device defined in claim 15 and further including:
  an unclamping switch mounted to said tool housing and aligned to engage a top surface of said upper plate as said upper plate is retracted upward with said drill by said pneumatic control, wherein said pneumatic control halts retraction of said drill when said unclamping switch engages said upper plate;
  a clamp switch mounted to one of said handles for manual actuation; and
  a second pneumatic control responsive to said unclamping switch for unclamping said tool housing from a valve seat of a valve bore to be reamed, said second pneumatic control further being responsive to the actuation of said clamping switch to clamp said tool housing to a valve seat of a valve bore to be reamed.

17. The boring device defined in claim 12 and further including a base fixture having a vertically adjustable support, said tool housing pivotally and physically attached to said fixture.

18. The boring device defined in claim 17 and further including a seat adapter which is removable from said tool housing without removing said tool housing from said fixture.

19. An automatic boring device comprising:
  a tool housing having upright walls, an upper plate, and a lower plate;
  a pneumatic drill removably attached to said upper plate;
  a pneumatic control for stopping a supply of air to said drill and causing air to be supplied to an air cylinder to retract said upper plate upward at the end of a downward boring cycle;
  a stop plate attached to said tool housing, said stop plate being vertically adjustable along a vertical post attached to said lower plate; and
  a switch attached to said upper plate, said switch positioned to contact said adjustable plate at the end of a boring cycle to activate said pneumatic control.

20. The boring device defined in claim 19 and further including two opposing handles attached to the exterior of said tool housing.

21. The boring device defined in claim 20 and further including a second pneumatic control for clamping a seating adapter of said tool assembly into alignment with a part that is to be bored.

22. The boring device defined in claim 21 and further including two manually-actuated first switches, each said first switch is mounted adjacent to one of said opposing handles, said first switches enabling selective manual engagement of said second pneumatic control.

23. The boring device defined in claim 22 and further including a third pneumatic control for initiating downward movement of said upper plate and said drill.

24. The boring device defined in claim 23 and further including two second switches, each said second switch is mounted adjacent to one of said opposing handles, said second switches enabling selective manual engagement of said third pneumatic control.

25. A boring device comprising:
  a base fixture having a vertically adjustable support and an adjustable fixture arm;
  a tool housing physically attached to said fixture arm of said base fixture and having an upper plate, said upper plate having a top, a bottom, and a bore extending from said upper plate top to said upper plate bottom;
  a pneumatic drill positioned substantially in a vertical orientation, said drill including a drill collar having an inner bore of dimensions corresponding to the exterior dimensions of said drill such that said pneumatic drill extends through said inner bore, said drill collar being removably mounted within said bore in said upper plate; and a set screw extending through a portion of said upper plate and engaging said drill collar to hold said pneumatic drill in place relative to said upper plate.

26. The boring device defined in claim 25 and further including an unclamping switch to activate a pneumatic control that unclamps said tool housing from a structure being bored.

27. The boring device defined in claim 25 and further including a seating adapter which is removable from said tool housing without removing the boring device from said fixture.

28. A boring system for reaming valve bores in a engine cylinder head, said boring system comprising:
 a base fixture having supports for supporting a cylinder head and having a fixture arm that extends over a cylinder head supported on said supports; and
 a boring device pivotally mounted to said fixture arm, said boring device comprising:
  a tool housing including a bottom plate having mounting structure extending below said bottom plate for pivotally mounting and physically attaching said tool housing to said fixture arm, said mounting structure having an aperture in which a seating adapter may be mounted for engaging a valve seat of the valve bore to be reamed; and
  a drill mounted to said tool housing such that a reaming bit extending from said drill extends through apertures in said bottom plate and the seating adapter.

29. The boring system as defined in claim 28, wherein said mounting structure is configured to allow seating adapters of different sizes to be interchanged without requiring said boring device to be removed from said fixture arm.

30. The boring system as defined in claim 28, wherein said fixture arm is a pneumatically controlled fixture arm for selectively clamping the seating adapter in a valve seat of the valve bore to be reamed.

31. The boring device as defined in claim 30, wherein said drill is a pneumatic drill.

32. The boring device as defined in claim 31, wherein said tool housing includes two handles extending along opposite sides of said tool housing.

33. A boring system for reaming valve bores in an engine cylinder head, said boring system comprising:
 a base fixture having supports for supporting a cylinder head and having a fixture arm that extends over a cylinder head supported on said supports; and
 a boring device pivotally mounted to said fixture arm, said boring device comprising:
  a tool housing including a bottom plate having mounting structure extending below said bottom plate for pivotally mounting said tool housing to said fixture arm, said mounting structure having an aperture in which a seating adapter may be mounted for engaging a valve seat of the valve bore to be reamed,
  a drill mounted to said tool housing such that a reaming bit extending from said drill extends through apertures in said bottom plate and the seating adapter, and
  a clamping switch and a cycle initiation switch mounted on said handles, wherein said pneumatically controlled fixture arm is responsive to actuation of said clamping switch and said pneumatic drill is responsive to actuation of said cycle switch.

* * * * *